US010437638B2

United States Patent
Burroughs et al.

(10) Patent No.: US 10,437,638 B2
(45) Date of Patent: Oct. 8, 2019

(54) METHOD AND APPARATUS FOR DYNAMICALLY BALANCING TASK PROCESSING WHILE MAINTAINING TASK ORDER

(71) Applicant: Intel Corporation, Santa Clara, CA (US)

(72) Inventors: William G. Burroughs, Macungie, PA (US); Jerry Pirog, Easton, PA (US); Joseph R. Hasting, Orefield, PA (US); Te K. Ma, Allentown, PA (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 15/626,806

(22) Filed: Jun. 19, 2017

(65) Prior Publication Data

US 2018/0365053 A1 Dec. 20, 2018

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
CPC .................................................... G06F 9/4881
See application file for complete search history.

(56) References Cited

U.S. PATENT DOCUMENTS

| | | | | |
|---|---|---|---|---|
| 6,088,679 A * | 7/2000 | Barkley | ........... | G06Q 10/06311 705/7.13 |
| 2003/0103232 A1* | 6/2003 | Twede | ................... | G06F 3/1204 358/1.15 |
| 2009/0076877 A1* | 3/2009 | Yano | ...................... | G06Q 10/00 705/7.27 |
| 2009/0276274 A1* | 11/2009 | Sasagawa | .............. | G06Q 10/06 705/7.27 |
| 2010/0010858 A1* | 1/2010 | Matoba | ................. | G06F 9/5038 705/7.27 |
| 2010/0174581 A1* | 7/2010 | Mochizuki | ............. | G06Q 10/06 705/7.15 |
| 2012/0089477 A1* | 4/2012 | Dean | ........................ | A43B 3/24 705/26.5 |
| 2012/0303401 A1* | 11/2012 | Tolgu | ..................... | G06Q 10/06 705/7.13 |
| 2013/0205240 A1* | 8/2013 | Ling | ....................... | G06F 19/26 715/771 |

(Continued)

*Primary Examiner* — Adam Lee
(74) *Attorney, Agent, or Firm* — Nicholson De Vos Webster & Elliott LLP

(57) ABSTRACT

Apparatus and method for multi-core dynamically-balanced task processing while maintaining task order in chip multi-processor platforms. One embodiment of an apparatus includes: a distribution circuitry to distribute, among a plurality of processing units, tasks from one or more work-flows; a history list to track all tasks distributed by the distribution circuitry; an ordering queue to store one or more sub-tasks received from a first processing unit as a result of the first processing unit processing a first task; and wherein, responsive to a detection that all sub-tasks of the first task have been received and that the first task is the oldest task for a given parent workflow tracked by the history list, all sub-tasks associated with the first task are to be placed in a replay queue to be replayed in the order in which each sub-task was received.

25 Claims, 20 Drawing Sheets

(56) References Cited

U.S. PATENT DOCUMENTS

2014/0297353 A1\* 10/2014 Srivastava ....... G06Q 10/06316
    705/7.26
2015/0067028 A1\* 3/2015 Kumar .................... H04L 67/10
    709/203
2017/0286337 A1 10/2017 Wang et al.

\* cited by examiner

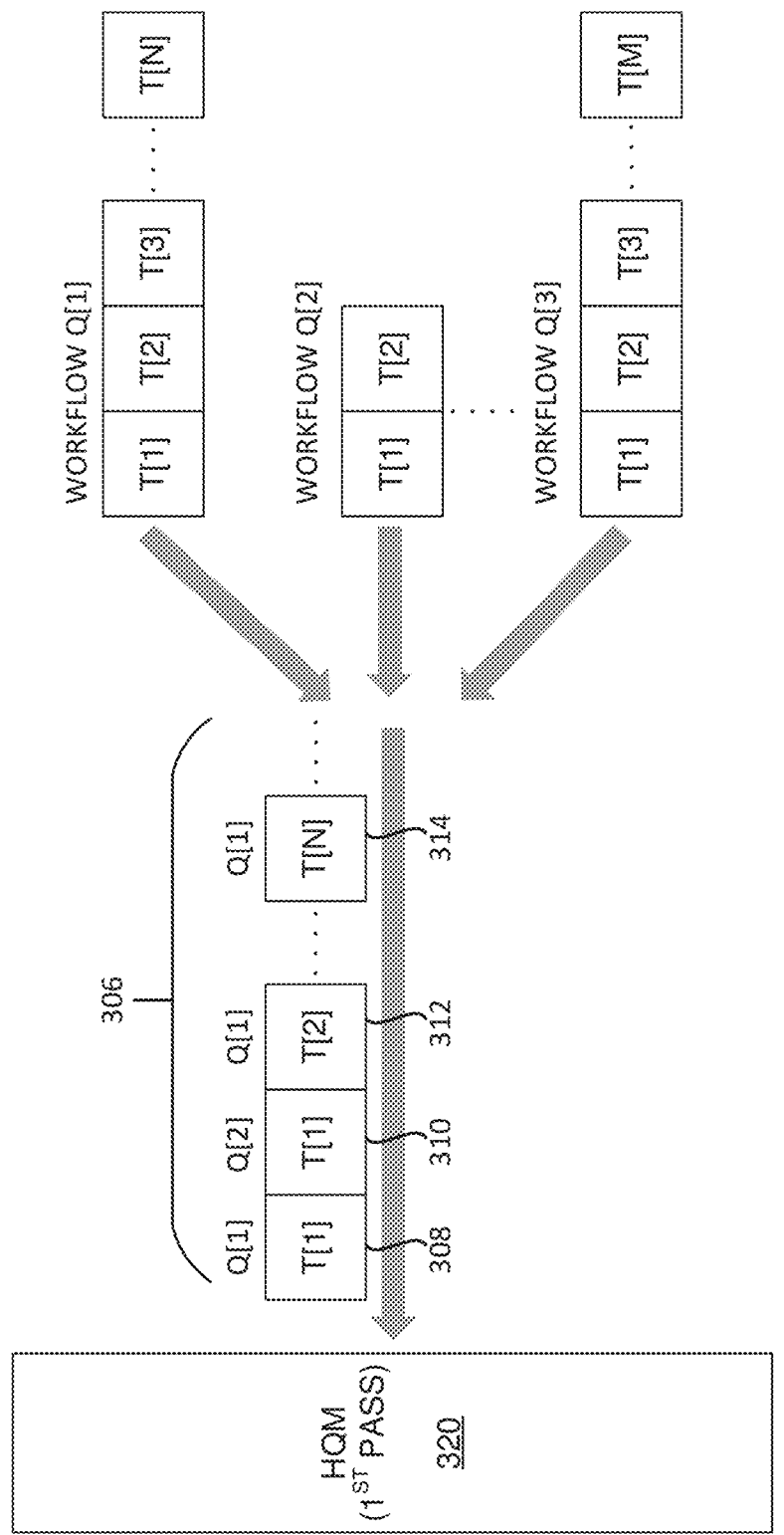

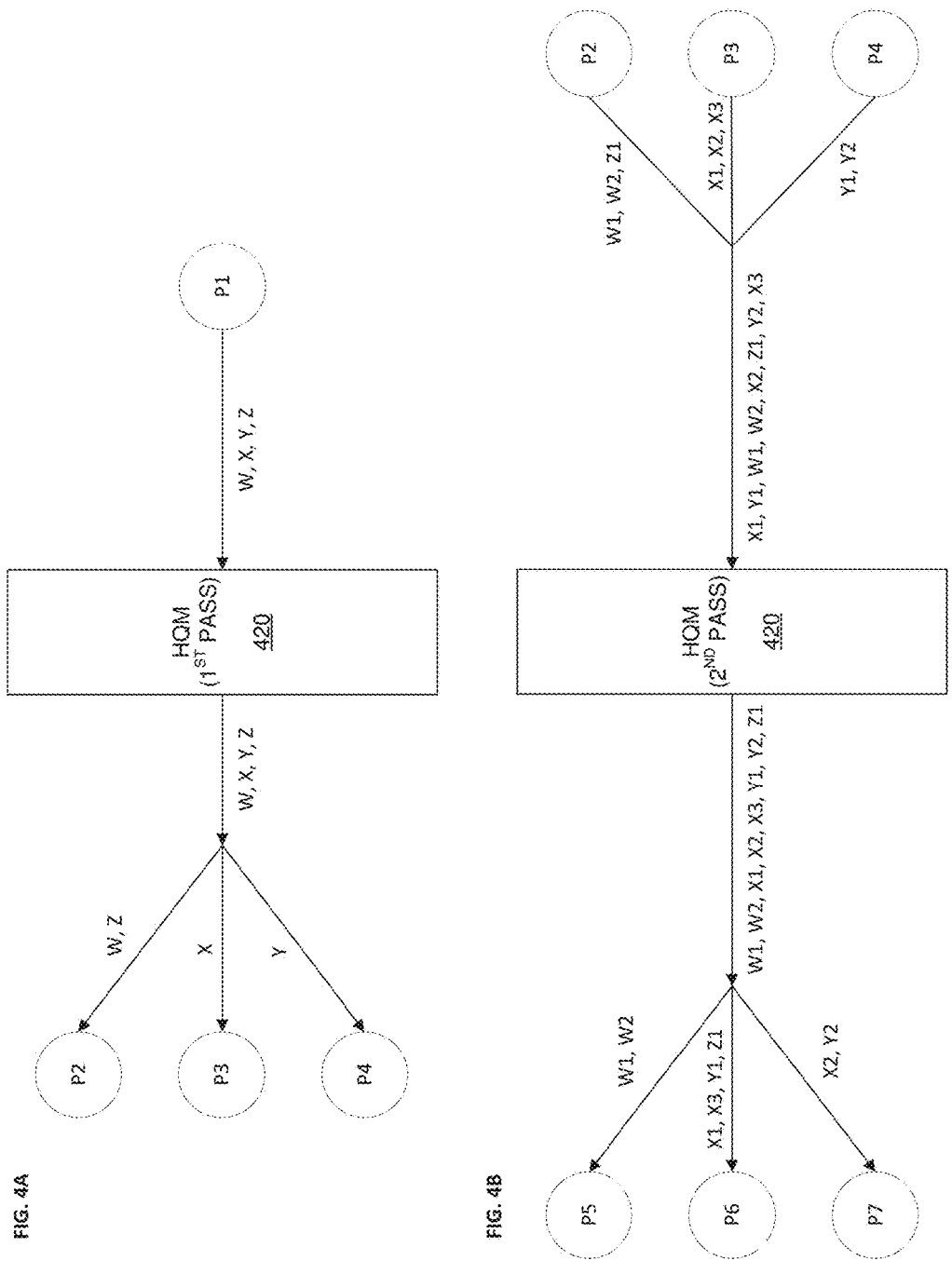

HISTORY LIST

HISTORY LIST

C[0]

| WORKFLOW ID | TASK ID | DATA |
|---|---|---|
| Q[1] | T[1] | SUB-TASK |
| Q[1] | T[1] | SUB-TASK |
| Q[1] | T[1] | SUB-TASK (END) |
| Q[1] | T[2] | SUB-TASK |

602 → row 1; 604 → row 2; 606 → row 3; 608 → row 4; 600 → table

C[1]

| WORKFLOW ID | TASK ID | DATA |
|---|---|---|
| Q[2] | T[1] | SUB-TASK |
| Q[2] | T[1] | SUB-TASK (END) |
| Q[1] | T[3] | SUB-TASK |

⋮

C[X]

| WORKFLOW ID | TASK ID | DATA |
|---|---|---|
| Q[1] | T[4] | SUB-TASK |
| Q[1] | T[4] | SUB-TASK |
| Q[1] | T[4] | SUB-TASK |

FIG. 6

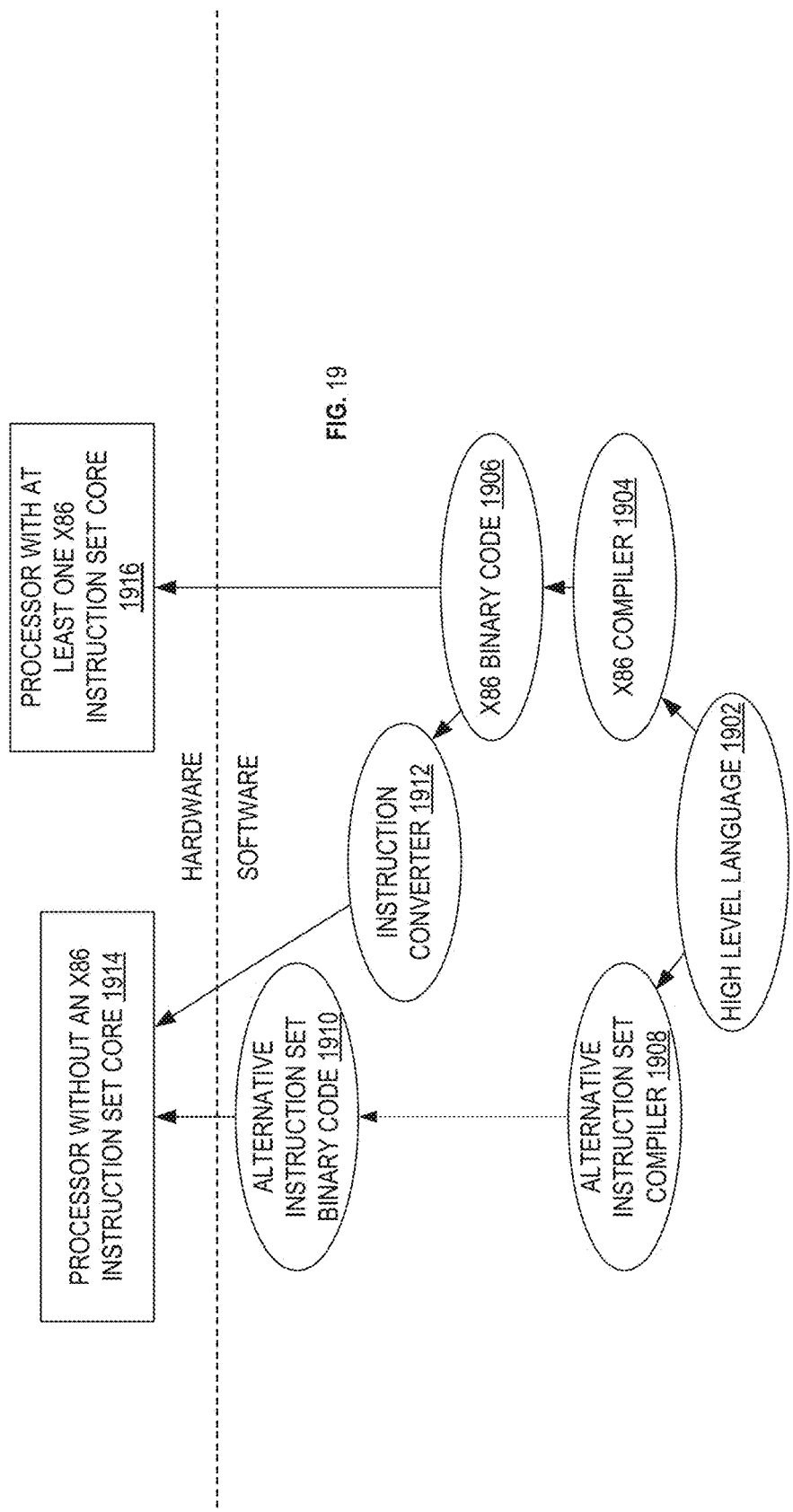

US 10,437,638 B2

METHOD AND APPARATUS FOR DYNAMICALLY BALANCING TASK PROCESSING WHILE MAINTAINING TASK ORDER

BACKGROUND

Field of the Invention

The various embodiments of the invention described herein relate generally to distributed processing and maintaining processing order in a computer processor or platform.

Description of the Related Art

In Chip Multiprocessor (CMP) platforms, reordered queues are used when there are one or more producers queuing up to communicate to multiple consumers with a requirement that the work (e.g., a set of tasks) be dynamically balance across those consumers and the results returned from the consumers be restored the original queue order. Existing techniques rely mostly on software to undertake the load-balancing and order-restoring duties. Such techniques place a huge drain on processor performance and bandwidth, due to the overhead involved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3A illustrates a stream of ordered tasks received by a hardware queue manager (HQM) according to an embodiment;

FIG. 4A-4B illustrate the operations performed by HQM with respect to tasks from a single workflow according to an embodiment;

FIG. 6 illustrate an embodiment of the ordering queue for storing sub-tasks received by the HQM;

FIG. 19 illustrates a block diagram contrasting the use of a software instruction converter to convert binary instructions in a source instruction set to binary instructions in a target instruction set according to embodiments of the invention.

DETAILED DESCRIPTION

Embodiments of apparatus and method for multi-core dynamically-balanced task processing while maintaining task order in chip multiprocessor platforms is described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Figure 1:
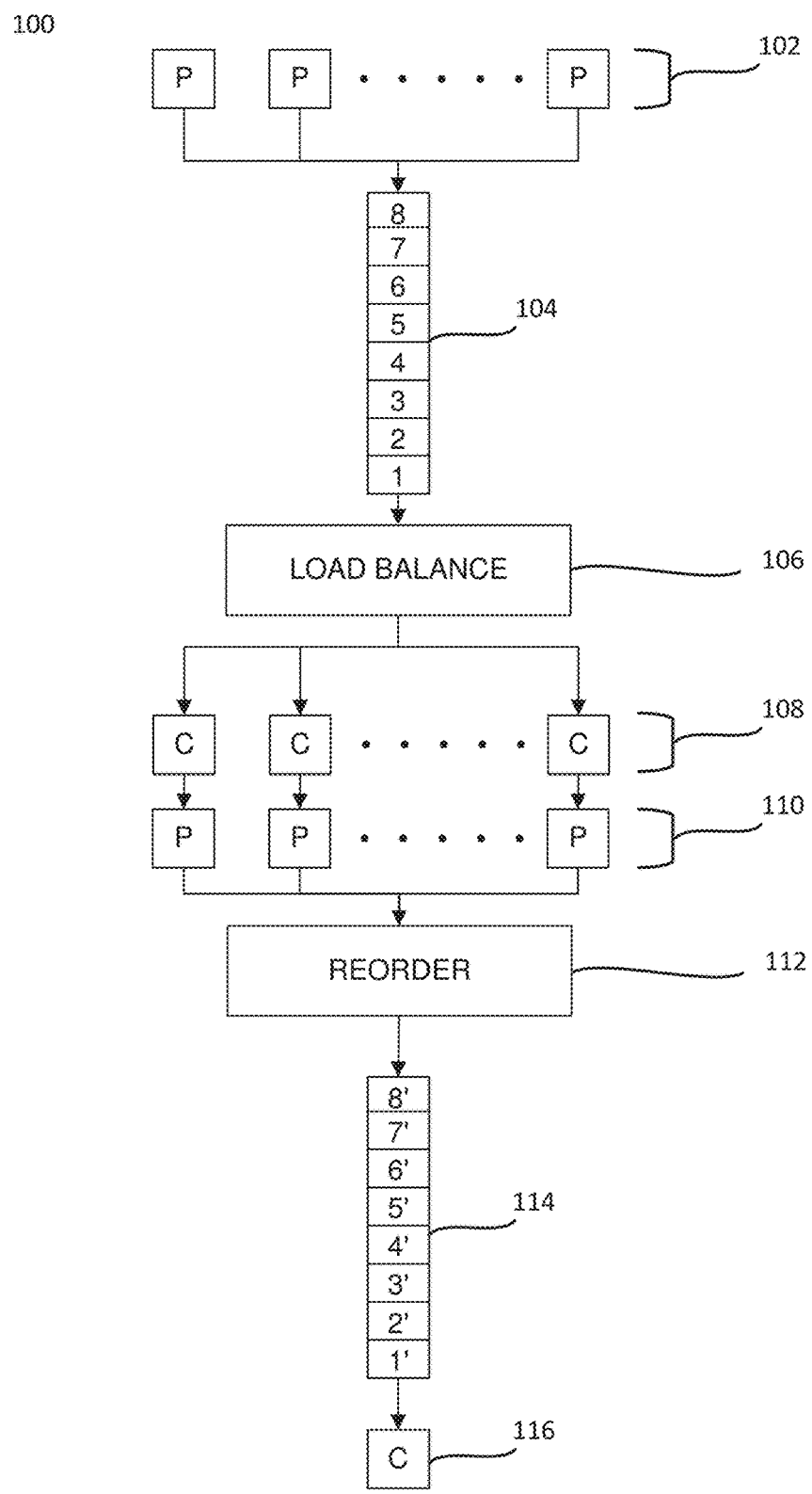
FIG. 1 illustrates an example of a reorder queue.

Reordered queues are used when there are one or more producers of work queuing up to communicate to multiple consumers with a requirement that the work (e.g., an ordered set of tasks) be dynamically balanced across the consumers and the results return from the consumers be restored to the original order. Examples of the producer and consumer may include processors, processing cores, execution units, threads, etc. FIG. 1 illustrates an embodiment where multiple producers (P) 102 submit work requests 104 that are to be load-balanced and distributed across a plurality of consumer processing units (C) 108 by a load balancing logic 106. The consumer processing units 108, in processing these work requests and generating results, become producers themselves (P) 110. The generated results are then reordered by a reordering logic 112 to restore the order of the original work requests. For example, the original stream of work requests 104 has resulted in a stream of generated results 114, where X' represents the result(s) of executing task X. The reordered results 114 are then sent to the destination consumer(s) 116, which may perform further processing. Presently most, if not all, load-balancing and reordering tasks are performed by software. Aspects of the invention are directed to offloading these software-processing tasks to a hardware manager.

Figure 2:
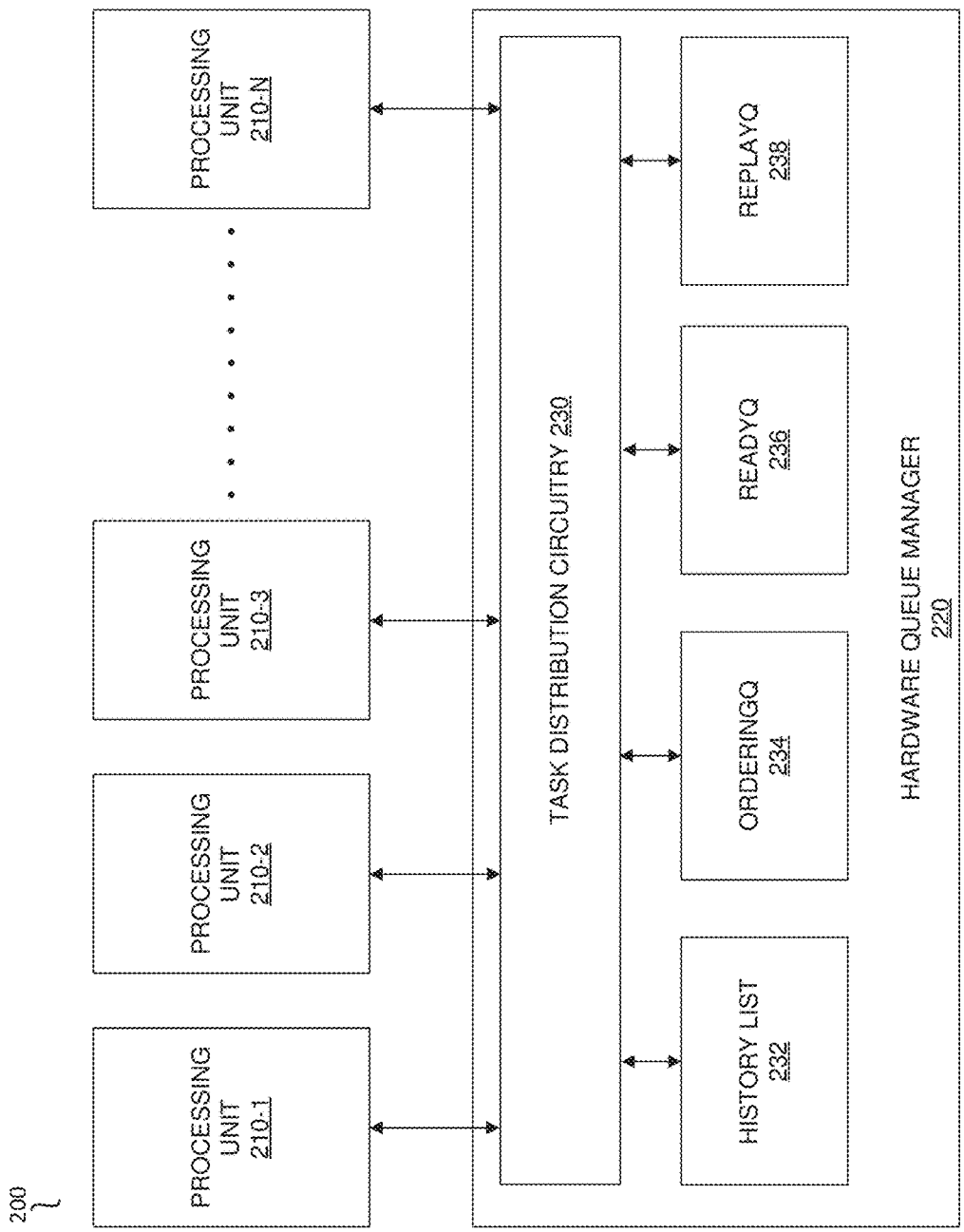
FIG. 2 illustrates a system platform on which embodiments of the invention may be implemented.

FIG. 2 illustrates a system platform on which embodiments of the invention may be implemented. System platform 200 includes various processing units 210-1~210-N that are communicatively and operatively coupled to a hardware queue manager (HQM) 220. Each of the processing units may be a producer that generates tasks or a consumer that processes tasks. In some embodiments, at least some of the processing units are both a producer and a consumer. According to an embodiment, the HQM 220 further include a task distribution circuitry/logic 230, a history list 232, a ordering queue (orderingQ) 234, a ready queue (readyQ) 236, and a replay queue (replayQ) 238. Each of history list, ordering queue, ready queue, and replay queue may be collectively managed by a singled manager (not shown) or, alternatively, separately managed by individual managers (not shown). The HQM 220 may additionally include a memory or storage unit (not shown) for storing the history list, ordering queue, ready queue, and/or replay queue.

In FIG. 3A, the HQM 320 receives a stream of tasks 306 from various workflows (e.g., workflows Q[1]-Q[3]). Each workflow includes one or more ordered tasks (e.g., T[1]-T[N]) that are sent sequentially to the HQM by one or more producers. While each of these ordered tasks may be processed or executed independently and non-sequentially by different processing units, the results that are generated from these tasks must be restored to the same order as the tasks that generated them. In FIG. 3A, a stream of tasks 306 from workflow Q[1], Q[2], and Q[3] is being sent to the HQM 320. While tasks from different workflows may be interleaved in task stream 306, tasks from the same workflow remain in order with respect to other tasks from the same workflow. For instance, tasks T[1] 308, T[2] 312, and T[N] 314 from workflow Q[1] remain in the same order as they were in workflow Q[1], despite task 310 from workflow Q[2] mixed-in between them in the stream.

After HQM 320 receives the tasks from the task stream 306, the HQM 320 distributes the tasks to one or more processing units for processing. According to an embodiment, the HQM 320 performs load-balancing to determine the processing unit to which each task is sent. The tasks received by a processing unit are to be processed in accordance to the order in which they are received. For instance, an earlier-received task is to be processed by the processing unit before a later-received task. The processing of the earlier-received task must complete before the next-received task can start processing. In some embodiments, one or more tasks may be associated with a task priority which is taken into consideration during the distribution of tasks to processing units. For instance, every task from workflow Q[1] may be assigned with high priority while tasks from workflows Q[2] and Q[3] are assigned with normal priority. In such embodiments, tasks with a higher priority are assigned and distributed for processing before lower priority tasks.

When a task is processed by a processing unit, one or more sub-tasks maybe generated. If one or more sub-tasks are generated, the task that generated sub-task may be referred to as the parent task of the generated sub-task. According to an embodiment, the generated sub-tasks are sent back to the HQM 320 to be reordered. Once the processing of the parent task is complete and all sub-tasks have been generated and sent to the HQM 320, an indication of completion is sent by the processing unit to the HQM 320. In one embodiment, the indication may be sent as part of the sub-task. For instance, a final sub-task may include an indication that it is the last sub-task generated from the execution of a parent task. Alternatively, a separate indication may be sent by the processing unit to the HQM 320 after the processing of the parent task is complete. This may be the case when the processing of the task did not generate any sub-tasks or did not complete until some time after the last sub-task was sent.

Upon receiving an indication of completion for a parent task the HQM 320 checks whether the parent task is the oldest task in the workflow. If so, the HQM 320 then sends all the sub-tasks of the completed parent task out to a destination in the order they were received from the processing unit. If the parent task did not generate any sub-task, then the entry corresponding to the parent task may be removed from the history list. According to an embodiment, whether or not a parent task is the oldest task in a particular workflow is determined based on information stored in the history list (e.g., element 232 from FIG. 2) of the HQM 320. In one embodiment, if the sub-tasks are to be further processed, each sub-task is treated by the HQM as an incoming task to be distributed among plurality of processing units. The HQM may apply the same or similar load-balancing and task-priority techniques described above when making distribution decisions for the sub-tasks.

Figure 3B:
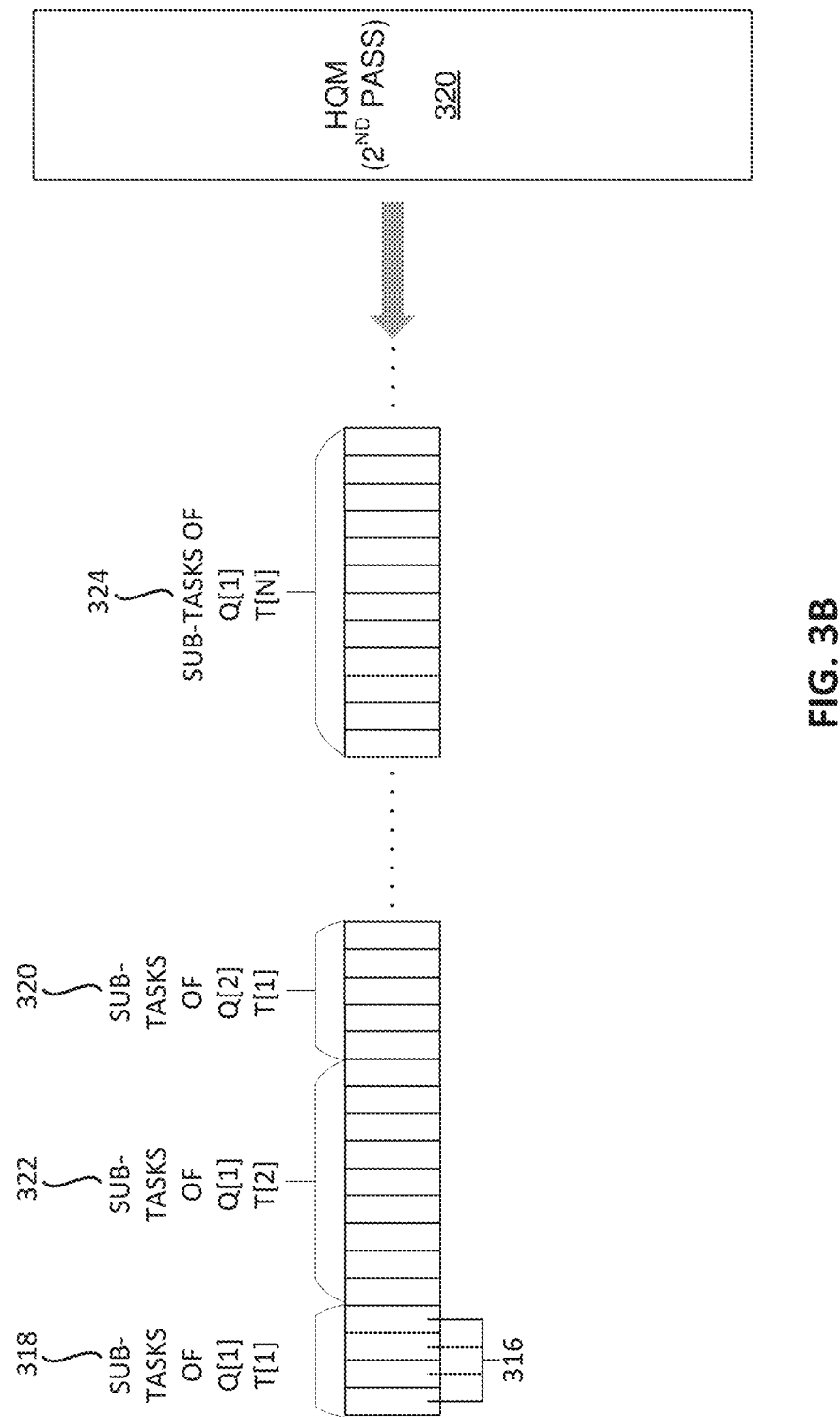
FIG. 3B illustrates a stream of ordered sub-tasks outputted by the HQM according to an embodiment.

FIG. 3B illustrates an exemplary stream of sub-tasks outputted by an HQM in accordance to an embodiment. The stream of sub-tasks illustrated in FIG. 3B reflect the results received from various processing units after the tasks in the task stream 306 shown in FIG. 3A are processed. Sub-tasks that are generated from the same parent task are grouped together and outputted in the same order as they were received by the HQM 320. For ease of description, sub-tasks from the same parent mask are collectively referred to as the sub-task cluster of the parent task. As shown in FIG. 3B, sub-task cluster 318 includes four sub-tasks 316 that were generated from the processing of parent task T[1] of workflow Q[1]. While shown as a sub-task cluster, each of these sub-tasks are outputted individually by the HQM 320 in the order they were received.

Furthermore, the ordering of the sub-task clusters reflects the order that their parent tasks were in, relative to other tasks in the original workflow. For instance, the sub-task clusters 318, 322, and 324 are generated, respectively, from tasks T[1] 308, T[2] 312, and T[N] 314 of workflow Q[1]. Accordingly, sub-tasks clusters 318, 322, and 324 are outputted by the HQM 320 in the same relative order as their parent tasks in workflow Q[1] (see, FIG. 3A). It is worth noting that the position of sub-task cluster 320 relative to sub-task clusters 318, 322, and 324 in the output stream does not reflect the position of its parent task in the input stream 306. This is because tasks from different workflows are independent from one another and thus need not be outputted in order. What is important is that the sub-tasks generated from tasks of the same workflow remain in the order that reflects the relative ordering of their parent tasks in the original workflow.

FIG. 4A-4B illustrate the operations performed by HQM with respect to tasks from a single workflow according to an embodiment. FIG. 4A illustrate a producer P1 sending tasks W, X, Y, and Z to HQM 420. Tasks W, X, Y, Z are from the same workflow and are transmitted to the HQM 420 in that order, such that W is transmitted first, followed by X, Y, and then Z. During the first pass, HQM 420 assigns and distributes tasks W, X, Y, and Z to different processing units P2-P4 for processing. The processing units P2-P4, in this sense, are consumers. In one embodiment, the HQM 420 utilizes a load-balancing algorithm or technique to determine the distribution of tasks among the processing units. Moreover, in some embodiments, the workflow that a task belongs to may determine the processing unit(s) the task may be assigned to. As shown in FIG. 4A, tasks W and Z are assigned to processing unit P2, task X is assigned to processing unit P3, and task Y is assigned to processing unit P4. In addition to the assigning and distributing tasks to different processing units, the HQM 420 stores and tracks information related to these tasks, such as the order in which they are received by the HQM 420, the workflow each of them belongs to, etc. These information are stored in various tables and lists, which are described below in further detail.

FIG. 4B illustrates a HQM reordering a steam of sub-tasks received from multiple processing units. After processing units P2-P4 processed their assigned tasks which generated one or more sub-tasks, these processing units become producers themselves. As illustrated in FIG. 4B, in processing task W, processing unit P2 generated sub-tasks W1 and W2. In processing task Z, processing unit P2 generated sub-task Z1. In processing task X, processing unit P3 generated sub-tasks X1, X2, and X3. Finally, in processing task Y, processing unit P4 generated sub-tasks Y1 and Y2.

Since tasks W, X, Y, Z are independent tasks, each of them may be processed by different processing units and/or at different times. This means each task may also generated sub-tasks at different time and in different orders relative to other tasks. For example, processing unit P3, in processing of task X, may start to generate sub-tasks (e.g., X1) before processing unit P2 starts generating sub-tasks from processing task W. This can occur even though task W was distributed to processing unit P2 before task X was distributed to processing unit P3, during the first pass of these tasks through HQM 420. As shown in FIG. 4B, the order in which the stream of sub-tasks were initially received by the HQM 420 is: X1-Y1-W1-W2-X2-Z1-Y2-X3. According to an embodiment, the HQM 420 stores these sub-tasks and later outputs them in orders them based, at least in part, on information tracked by the HQM 420. The operation and logic of the reordering will be described in detail later below.

After being reordered by the HQM, the output stream of sub-tasks becomes: W1-W2-X1-X2-X3-Y1-Y2-Z1. This reflects the original ordering of the tasks (i.e., W-X-Y-Z), as all sub-tasks from task W (i.e., W1 and W2) are outputted before any of the subtasks from tasks X, Y, and Z are outputted. All sub-tasks from task X (i.e., X1, X2, and X3) are outputted before the sub-tasks from task Y and task Z are outputted, and so on. According to the embodiment, the outputted sub-tasks are distributed/load-balanced across processing units P5-P7 for further processing. When the HQM 420 distributes the sub-tasks during the $2^{nd}$ pass, each sub-task cluster may be treated as a new workflow. For instance, sub-tasks W1 and W2 that were generated from task W may be treated as a new workflow comprising two tasks, W1 and W2. The same goes for the rest of the sub-tasks.

Processing units P1-P7 are shown as separate and different units for ease of illustration. It is not a requirement that the processing units all be different. Rather, some of the illustrated processing units may be the same processing unit. For instance, P1 and P2 may denote the same processing unit, such that one or more tasks that were sent from P1 to HQM 420 are redistributed back to P1 for processing. Similarly, P3 and P6 may denote the same processing unit such that one or more sub-tasks that were sent from P3 to the HQM may be redistributed back to P3 for processing.

Figure 5A:
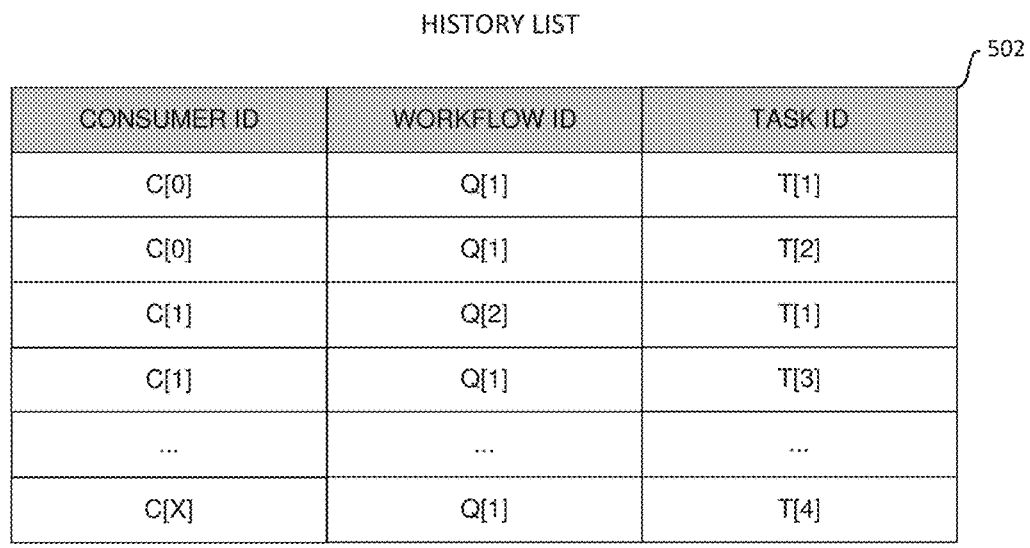
FIG. 5A-5B illustrate exemplary embodiments of the history list.
Figure 5B:
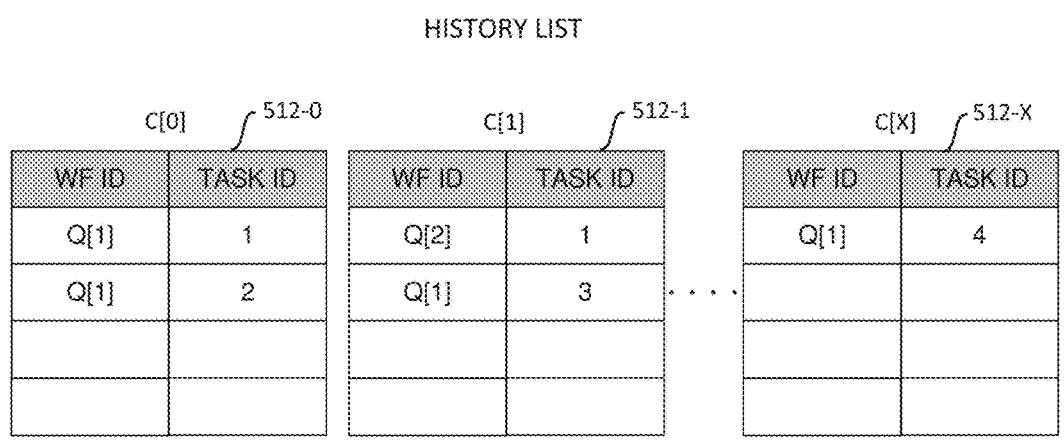

FIGS. 5A and 5B illustrate exemplary embodiments of the history list. The history list may be maintained as a table, a linked-list, or any other suitable data-storage structure. According to an embodiment, the history list is maintained by the HQM and is updated each time the HQM receives a task. For each received task, the history list tracks: the workflow of the task, the order of the task in the workflow, and the processing unit to which the task is assigned for processing. The history list may be implemented as a single list or a collection of lists. According to an embodiment, entries in the history list are arranged chronologically based on when the corresponding task is received by the HQM. FIG. 5A illustrate an embodiment of a history list implemented as a single list. Every entry in the history list 502 includes a consumer identification (ID) field, a workflow ID field, and a task ID field. The consumer identification (ID) field tracks the processing unit to which a task is assigned or distributed for processing. In one embodiment, each consumer ID uniquely identifies a processing unit. The workflow ID field tracks the workflow that the corresponding task belongs to. For instance, as shown in FIG. 3A, task T[1] 308 belongs to workflow Q[1]. Thus, the entry for task T[1] 308 in the history list would have a workflow ID that corresponds to workflow Q[1]. According to an embodiment, the workflow ID may be used to determine the appropriate processing unit(s) that a corresponding task may be assigned to. In other words, a task may be restricted to a subset of processing units based on the workflow it is a part of. As for the task ID field, it is used to track a task's position or order relative to other tasks in the same workflow. According to an embodiment, the task ID stored in a task ID field is a numerical value that is sequentially assigned by the HQM. The sequence of task IDs may be unique to each workflow or may be shared between different workloads, so long as the assigned task IDs can be used to determine the ordering of tasks in the same workload. For example, referring to FIG. 3A, task T[1] 308 of workflow Q[1] would have a task ID that indicates it as the first task of workflow Q[1], task T[2] 312 of workflow Q[2] would have a task ID that indicates it as the second task, and so on.

FIG. 5B illustrates an embodiment of a history list implemented as multiple lists or tables. In FIG. 5B, each list 512-0~512-X corresponds to a processing unit and tracks the tasks assigned to each corresponding processing unit. Each entry in the lists 512-0~512-X includes a workflow ID field and a task ID.

While the history lists in FIGS. 5A and 5B are shown with fields such as the consumer ID field, workflow ID field, and task ID field, they may include additional fields that are not shown. Moreover, some of the fields may be combined or consolidated. For instance, the workflow ID field and the task ID field may be consolidated into a single field. Further, some fields may be eliminated or implemented in different ways, such as the case illustrated in FIG. 5B, where instead of having a consumer ID field, each consumer has its own list.

FIG. 6 illustrates an embodiment of the ordering queue for storing sub-tasks received by the HQM. According to an embodiment, the ordering queue includes multiple queues or lists, each one corresponding to a processing unit and is used to store the sub-tasks received by the HQM from that processing unit. When the HQM receives a sub-task from a processing unit, the sub-task is stored in (e.g., appended to) the list corresponding to the processing unit. In one embodiment, the appropriate list is determined based on information stored in the history list. Since tasks that are sent to a given processing unit are processed in order by the processing unit, it can be assumed that the sub-tasks being sent back from processing unit are in the same order. For instance, if tasks A and B are sent to the processing unit for processing and both generated sub-tasks, it is assumed that all sub-tasks which resulted from the processing of task A are sent back to the HQM before any of the sub-tasks generated from task B. Moreover, in an embodiment, the processing unit may send additional indications with each sub-task that it sends back to the HQM. For example, an indication of completion may be sent by the processing unit to the HQM upon completion of a task. The indication of completion may be sent along with a sub-task indicating it as the last sub-task for the completed task, or alternatively the indication of completion may be sent as a separate signal. For sub-tasks that are not the last sub-task, they may simply be sent with a sub-task indication to distinguish them from other types of communication. Based on these assumptions, as well as the information stored in the history list, the received sub-tasks can be stored to the appropriate orderingQ.

To illustrate the entries stored in the history list in FIG. 5A. For processing unit C[0], two tasks, T[1] and T[2] from workflow Q[1] has been assigned. As noted above, processing unit C[0] will finish processing task T[1] before it starts processing task T[2]. Thus, any sub-task received from processing unit C[0] before an indication of completion is received must have been generated from the processing of task T[1]. As such, these sub-tasks are stored to the orderingQ associated with processing unit C[0]. As shown in FIG. 6, sub-tasks 602, 604, and 606 are stored in processing unit C[0]'s orderingQ 600. Since sub-task 606 includes an indication of completion (i.e., "END"), the next received sub-task 608, must be generated from the processing of task T[2]. According to an embodiment, the workflow ID and task ID associated with each sub-task may also be stored in the orderingQ.

Figure 7:
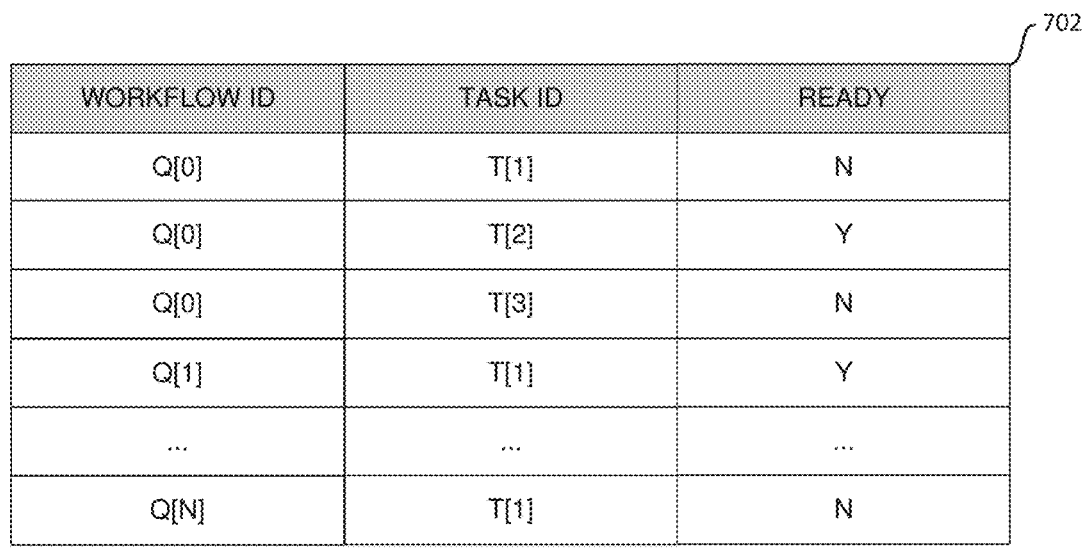
FIG. 7 illustrates an embodiment of a ready queue (readyQ) for tracking the tasks that are ready for replay.

FIG. 7 illustrates an embodiment of a ready queue (readyQ) for tracking the tasks that are ready for replay. Each entry in the readyQ corresponds to a unique task. In one embodiment, each entry in the readyQ includes a workflow ID field, a task ID field, and a ready field. The workflow ID and the task ID are used to unique identify a task. The ready field indicates whether the task is ready to be replayed. In one embodiment, the ready field of a task is set if all sub-tasks corresponding to that task has been received by the HQM. This may be determined based on the HQM receiving an indication of completion described above. When an indication of completion is received by the HQM, the HQM responsively updates the readyQ by setting the ready field in the entry corresponding to the completed task. In one embodiment, the readyQ may be sorted chronologically so that the oldest task in each workflow can be easily determined. In one embodiment, the information tracked by the readyQ may be implemented as part of the history list rather than a separate list. For instance, the history list may include a ready field for each entry.

Figure 8:
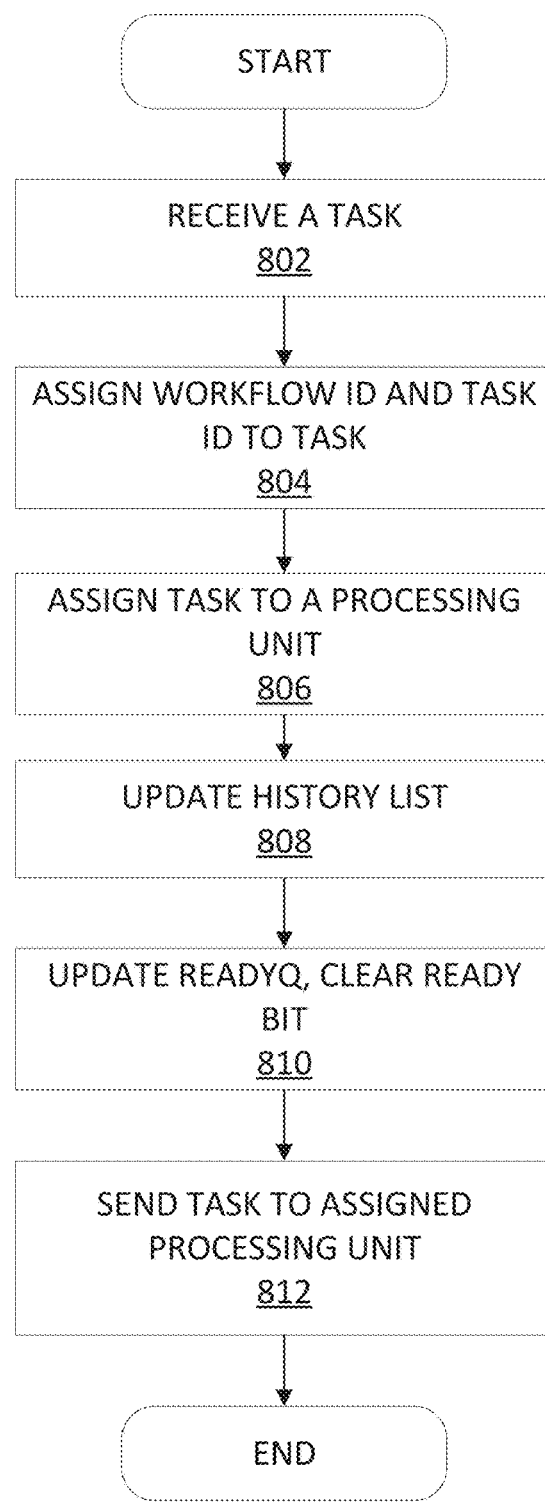
FIG. 8 is a flow diagram illustrating the operation and logic of the HQM for processing a received task in accordance to an embodiment.

FIG. 8 is a flow diagram illustrating the operation and logic of the HQM for processing a received task in accordance to an embodiment. At block 802, the HQM receives a task. The task may be generated by a producer processing unit as a result of executing an instruction, an operation, or a parent task. The task may be part of a workflow that includes multiple tasks. At block 804, the HQM assigns to the task a workflow ID and a task ID. According to an embodiment, the workflow ID identifies the workflow to which the task belongs. The workflow ID may be based, in part, on the producer processing unit that generated the task. The workflow ID may also be based on the instruction, operation, or parent task which produced the task. The task ID, on the other hand, is assigned sequentially by the HQM to tasks in the same workflow, according to an embodiment. The HQM may include additional logic/circuitry for tracking the last assigned task ID for each workflow. Once the last task ID of a given workflow is assigned to a task, the last task ID is updated to the next ID in the sequence. At block 806, the HQM assigns the task to a processing unit for processing. As noted above, the processing unit may be assigned based on the workflow that the task belongs to. According to an embodiment, the task may only be assigned to a subset of the available processing units based on the workflow ID. In one embodiment, the HQM selects the processing unit based on a set of load balancing algorithms. Moreover, in some embodiments, the task ID is assigned to a task after the task has been assigned or scheduled to a processing unit for processing. At block 808, the HQM updates the history list to include an entry for the received task. The entry may include information used for tracking the workflow of the received task, the order of the received task in its parent workflow, and/or the processing unit to which the task is assigned for processing. At block 810, the HQM updates the ready queue (readyQ) to include an entry for the received task. This may include initializing the entry in the readyQ by setting or clearing a ready bit in the entry. At block 812, the HQM sends the task to the assigned processing unit.

Figure 9:
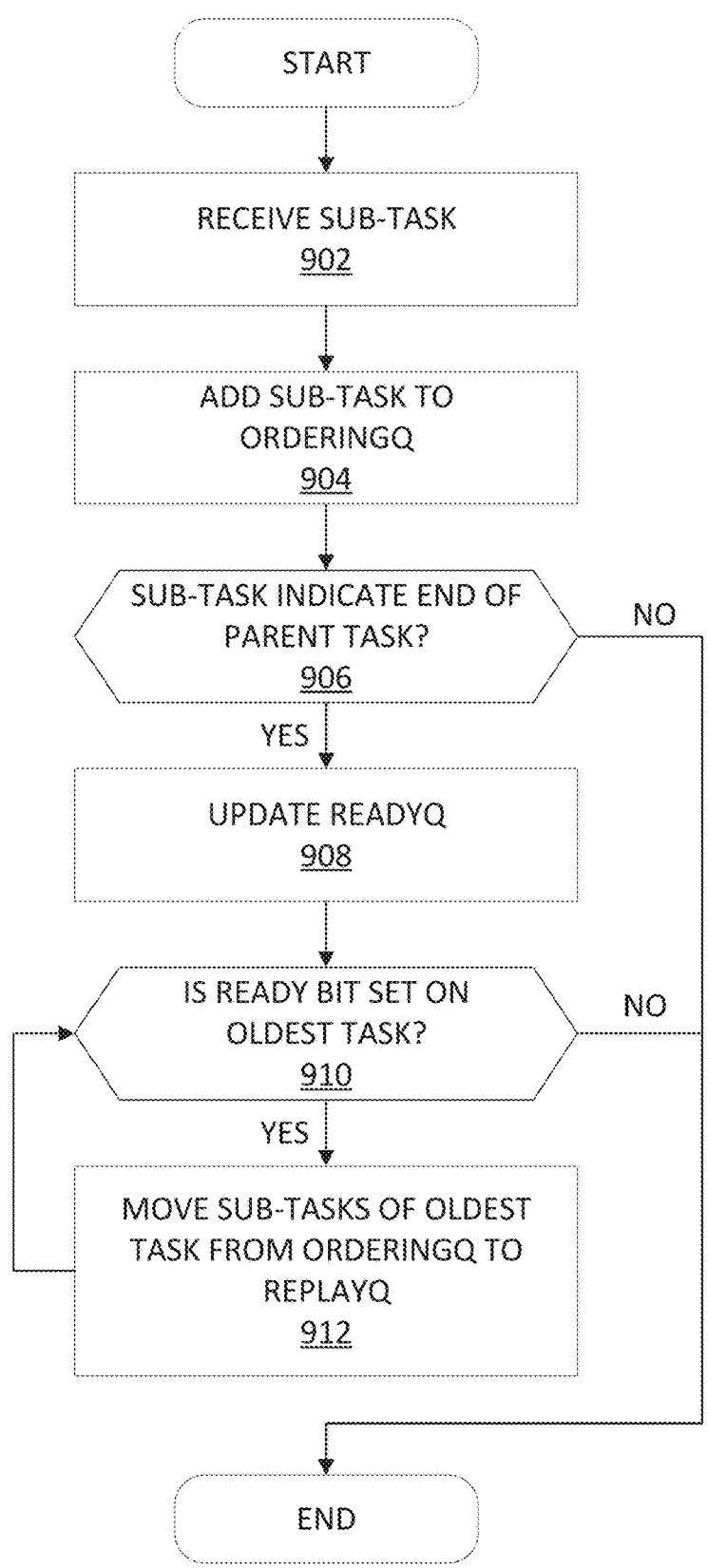
FIG. 9 is a flow diagram illustrating the operation and logic of the HQM for processing a received sub-task in accordance to an embodiment.

FIG. 9 is a flow diagram illustrating the operation and logic of the HQM for processing a received sub-task in accordance to an embodiment. At block 902, the HQM receives a sub-task. A sub-task is generated by a producer processing unit as a result of executing a parent task. In one embodiment, the sub-task includes an indication signaling that it is a sub-task, as opposed to other types of communication. At block 904, the HQM adds the sub-task to the orderingQ. At block 906, a determination is made on whether the sub-task is a last sub-task, which would indicate that the processing unit has finished processing the parent task. According to an embodiment, the last sub-task of a parent task includes an indication of completion signaling that it is the last sub-task from the parent task. In other embodiments, the indication of completion is sent separately from the last sub-task upon the completion of the parent task. If at block 908 the received sub-task is determined to be the last sub-task of a parent task, the HQM updates the readyQ, otherwise the process stops. In one embodiment, as part of updating the readyQ, the ready bit in the entry corresponding to the parent task is set. At block 910, a determination is made on whether the ready bit is set on the oldest task in any of the workflows. This may be determined based on the task ID of the parent task, which, according to an embodiment, was sequentially assigned for tasks in the same workflow. At block 912, upon detecting that the ready bit is set on the oldest task of a workflow, all sub-tasks that are associated with the oldest task are moved from the ordering queue and into the replay queue. In one embodiment, the entries that correspond to the oldest task are removed from the history list, order queue, and read queue. After removal of the oldest parent task entry in the ready queue, the process returns to block 910, where a search for an oldest task with its ready bit set is repeated. If no such task is found, process ends.

Figure 10:
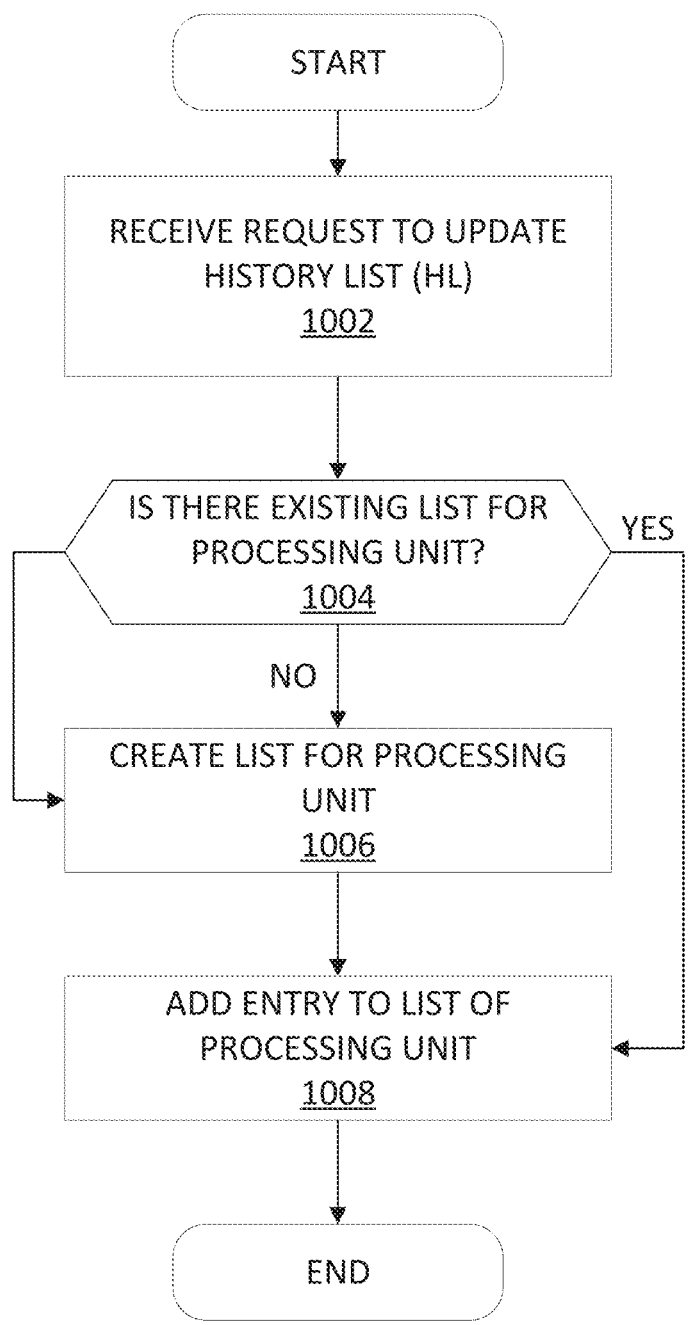
FIG. 10 is a flow diagram illustrating the operation and logic of the HQM for updating the history list in accordance to an embodiment.

FIG. 10 is a flow diagram illustrating the operation and logic of the HQM for updating the history list in accordance to an embodiment. In some embodiments, FIG. 10 is an extension of block 808 from FIG. 8. At block 1002, a request is received to update the history list. The request may be received and processed by a history list manager responsible for managing the history list. According to an embodiment, the request includes information pertaining to the received task, including the workflow ID, task ID, and the processing unit that is assigned to process the task. At block 1004, the history list manager checks to see if there is an existing list for the processing unit assigned to process the task. A list for the processing unit is created at block 1006 if no existing list was found. If the history list is implemented as a single list (e.g., FIG. 5A) instead of separate lists for each of the process units (e.g., FIG. 5B), then the operations in block 1004 and 1006 may be omitted. At block 1008, an entry is added to the newly-created list or an existing list for the processing unit. The entry includes information pertaining to the received task, including the workflow ID, task ID, and the processing unit that is assigned to process the task.

Figure 11:
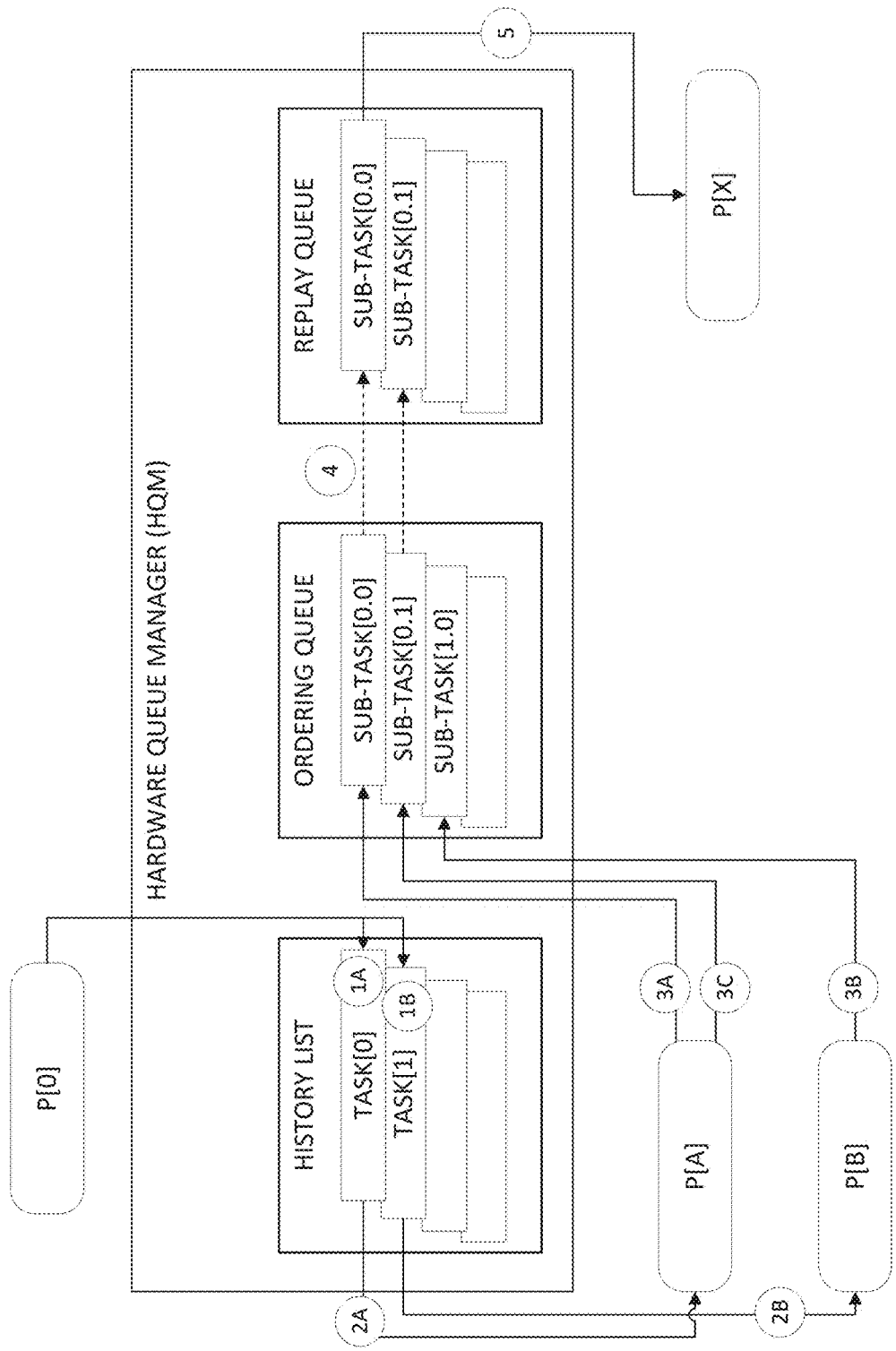
FIG. 11 is a detailed example of the operations performed by the HQM according to an embodiment.

FIG. 11 is a detailed example of the operations performed by the HQM. At 1A, producer P[0] sends an ordered task to the HQM. The ordered task is assigned a task number 0 (i.e., task[0]) and tracked in the history list. Thereafter, at 1B, producer P[0] sends another ordered task to the HQM. This ordered task is assigned a task number 1 (i.e., task[1]) and tracked in the history list. In some embodiments, task[0] and task[1] are stored in an ordering queue associated with producer P[0]. At 2A, task[0] is scheduled and distributed to processing unit P[A] for processing. Task[0] is scheduled first because it was received first. At 2B, task[1] is scheduled and distributed to processing unit P[B] for processing. At 3A, processing unit P[A] sends sub-task[0.0] to the HQM while processing task[0]. Sub-task[0.0] is stored in the ordering queue. At 3B, processing unit P[B] sends sub-task [1.0] to the HQM while processing task[1]. This sub-task is stored in the ordering queue. Then at 3C, processing unit sends sub-task[0.1] to the HQM, completing the processing of task[0]. In one embodiment, an indication of completion is sent with sub-task[0.1] or shortly thereafter. It is worth noting that while sub-task[0.0] and sub-task[0.1] must be delivered to the HQM in order, there is no such requirement for sub-task[1.0]. Since sub-task[1.0] is independent from sub-task[0.0] and sub-task[0.1], it may be delivered before, after, or in between sub-task[0.0] and sub-task[0.1]. In one embodiment, the HQM or logic in the HQM will sort out the sub-tasks and arrange them appropriately in the ordering queue. At 4, when both sub-task[0.0] and sub-task[0.1] have been received by the HQM, task[0] is complete and is the oldest task in the ordering queue. As such, sub-task [0.0] and sub-task[0.1] are moved from the ordering queue to the replay queue. Each sub-task in the replay queue is treated as a new task. At 5, sub-task[0.0] in the replay queue is scheduled and distributed to any available processing unit (e.g., P[X]) for further processing, if necessary.

Figure 12:
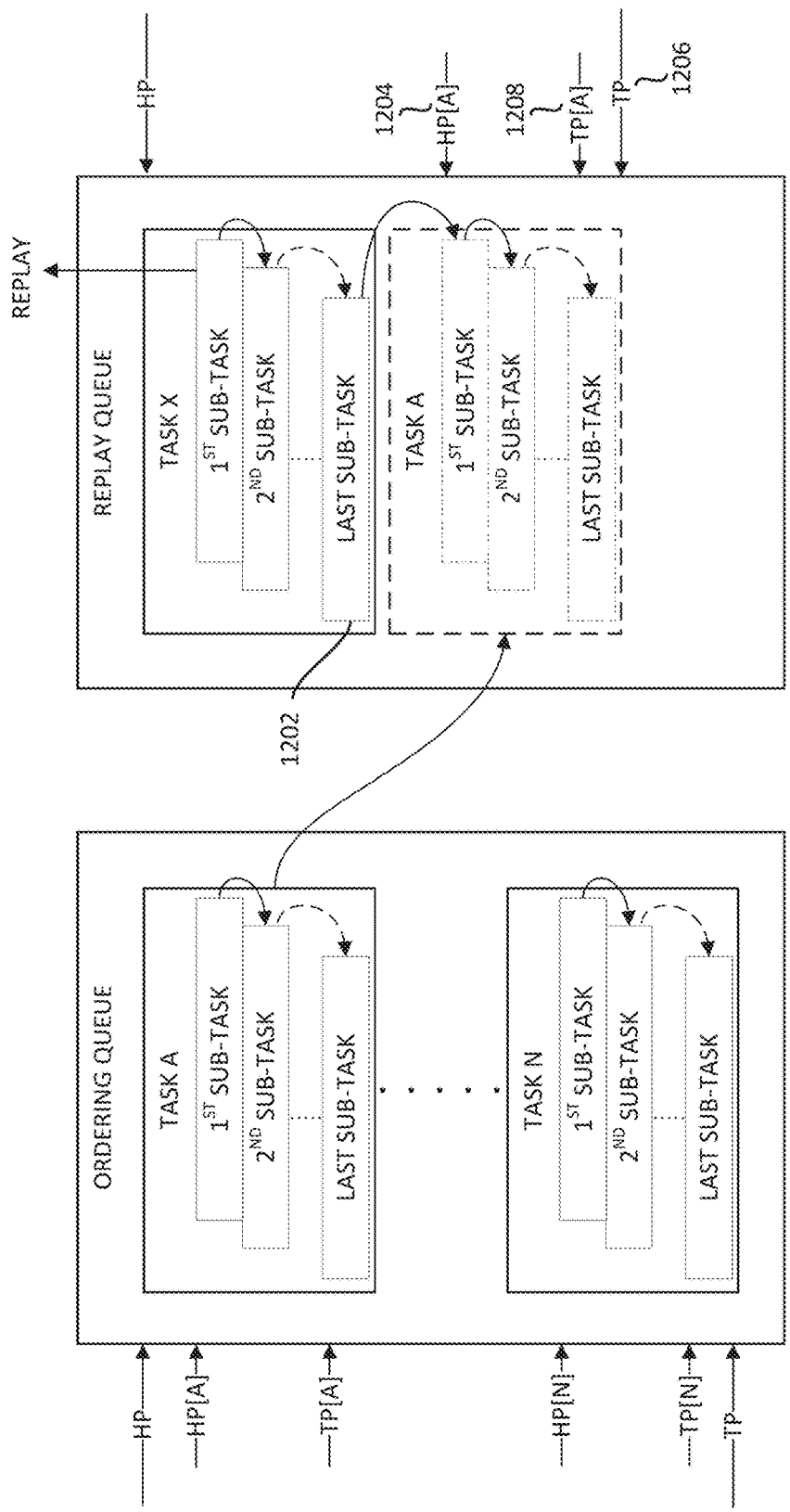
FIG. 12 illustrates an embodiment of the ordering queue and replay queue implemented as linked lists.

FIG. 12 illustrates an embodiment of the ordering queue and replay queue implemented as linked lists. As described above, sub-tasks that are received by the HQM are stored in the ordering queue based on information in the history list, such as the source processing unit and the task ID. Each sub-task may include an indication indicating that they are sub-tasks. When all sub-tasks associated with a task have been received and the task is the oldest task in the ordering queue, all sub-tasks associated with the task are moved from the ordering queue to the replay queue. To do so, according to an embodiment, the head-pointer and tail-pointer associated with the task is used to move the sub-tasks in a single operation, without having to pop each sub-task individually from the ordering queue. For example, as shown in FIG. 12, to move the sub-tasks associated with task A from the ordering queue to the replay queue, the last sub-task of task X is linked to the first sub-task of task A. Specifically, the next point of the last sub-task 1202 is set to the head pointer HP[A] 1204 of task A and the tail pointer of the replay queue 1206 is set to the tail pointer TP[A] 1208 of task A, thereby linking all sub-tasks of task A to the replay queue.

An embodiment of the present invention is an apparatus that includes a distribution circuitry and a memory unit. The distribution is to distribute, among a plurality of processing units, tasks from one or more workflows. The distributed tasks are to be processed in the order in which they are received by the plurality of processing units, such that an earlier-received task is to be processed by the receiving processing unit before a later-received task. The memory unit is to store a history list that tracks each task distributed by the distribution circuitry and an ordering queue that stores one or more sub-tasks received from a first processing unit of the plurality of processing units as a result of the first processing unit processing a first task. The one or more sub-tasks are to be sorted based on tracked information associated with the first task in the history list and to be stored based on an order in which each sub-task was received. Moreover, responsive to a detection that all sub-tasks of the first task have been received and that the first task is the oldest task for a given parent workflow tracked by the history list, all sub-tasks associated with the first task are to be placed in a replay queue to be replayed in the order in which each sub-task associated with the first task was received. Each tracked task may be associated with an assigned processing unit, a parent workflow, and a task identification number (task ID). The distribution circuitry may distribute the tasks among the plurality of processing units through load-balancing and may distribute the tasks from the same workflow in accordance to their ordering in the workflow. The apparatus may further include a ready queue to track, for each task, whether all sub-tasks corresponding to the task have been stored in the ordering queue. The ready queue may also track the oldest task in each workflow, which may be determined based on the task ID. When the sub-tasks in the replay queue are to be replayed, they may be distributed by the distribution circuitry as new tasks to be processed. The ordering queue and the replay queue may include linked lists defined by a plurality of head and tail pointers. Sub-tasks may be moved from the ordering queue to the replay queue through updating the plurality of head and tail pointers. Moreover, the ordering queue may include a plurality of sub-lists, each of which corresponds to a processing unit and is used to store the sub-tasks received from that processing unit.

Another embodiment of the present invention is a method that includes: distributing, among a plurality of processing units, tasks from one or more workflows that are to be processed according to the order in which the tasks are received by the plurality of processing units, such that, for each processing unit, an earlier-received task is to be processed before a later-received task; tracking each distributed task in a history list; storing, in an ordering queue, one or more sub-tasks received from a first processing unit of the plurality of processing units as a result of the first processing unit processing a first task, the one or more sub-tasks to be sorted based on tracked information associated with the first task in the history list and are to be stored in accordance to the order in which each sub-task was received; and wherein, upon detecting that all sub-tasks of the first task have been received and that the first task is an oldest-tracked task for a given parent workflow, responsively placing all sub-tasks of the first task into a replay queue to be replayed according to the order they are stored in the ordering queue. Each task tracked may be associated with an assigned processing unit, a parent workflow, and a task identification number (task ID). The tasks may be distribute among the plurality of processing units through load-balancing. Tasks from the same workflow may be distributed may be distributed in accordance to their ordering in the workflow. The method may further include tracking, for each task, whether all corresponding sub-tasks have been stored. They method may also include tracking the oldest task in each workflow and determining the oldest task in each workflow based on the task ID associated with each task. The method may further include distributing each sub-task in the replay queue as a new task to be processed. The ordering queue and the replay queue may include linked lists defined by a plurality of head and tail pointers such that sub-tasks may be moved from the ordering queue to the replay queue through updating the plurality of head and tail pointers. The ordering queue may include a plurality of sub-lists, each of which corresponds to a processing unit and is used to store sub-tasks received from the corresponding processing unit.

Embodiments of the present invention also include a system that includes one or more producers to generate workflows, each of the workflow including one or more tasks; a plurality of processing units to process the tasks; a distribution circuitry to distribute the tasks among the plurality of processing units, the tasks are to be processed in an order received by each of the plurality of processing units, such that an earlier-received task is to be processed before a later-received task; a history list to track the distributed tasks; an ordering queue to store one or more sub-tasks received from a first processing unit of the plurality of processing units as a result of the first processing unit processing a first task, the one or more sub-tasks to be sorted based on tracked information associated with the first task in the history list and stored based on an order in which each sub-task was received; and wherein, responsive to a detection that all sub-tasks of the first task have been received and that the first task is the oldest task for a given parent workflow tracked by the history list, all sub-tasks associated with the first task are to be placed in a replay queue to be replayed in the order in which each sub-task associated with the first task was received. The history list and the ordering queue may be implemented or stored in a memory unit. Each tracked task may be associated with an assigned processing unit, a parent workflow, and a task identification number (task ID). The distribution circuitry may distribute the tasks among the plurality of processing units through load-balancing and may distribute the tasks from the same workflow in accordance to their ordering in the workflow. The apparatus may further include a ready queue to track, for each task, whether all sub-tasks corresponding to the task have been stored in the ordering queue. The ready queue may also track the oldest task in each workflow, which may be determined based on the task ID. When the sub-tasks in the replay queue are to be replayed, they may be distributed by the distribution circuitry as new tasks to be processed. The ordering queue and the replay queue may include linked lists defined by a plurality of head and tail pointers. Sub-tasks may be moved from the ordering queue to the replay queue through updating the plurality of head and tail pointers. Moreover, the ordering queue may include a plurality of sub-lists, each of which corresponds to a processing unit and is used to store the sub-tasks received from that processing unit.

Embodiments of the present invention further includes a method that includes: receiving a task from a producer; assigning a workflow identifier (ID), task ID, and processing unit to the task; tracking the workflow ID, task ID, and processing unit assigned to the task in a history list; updating a ready queue to include an entry for the received task; and sending the task to the assigned processing unit for processing.

Another embodiment of a method includes: receiving a sub-task and responsively adding the sub-task to an ordering queue; updating a ready queue upon determining that the received sub-task indicates an end of processing on a parent task, by setting a ready bit of an entry associated with the parent task in the ready queue; and wherein upon a determination that the parent task is an oldest task in the ready queue, responsively move all sub-tasks of the parent task from the ordering to a replay queue.

Figure 13:
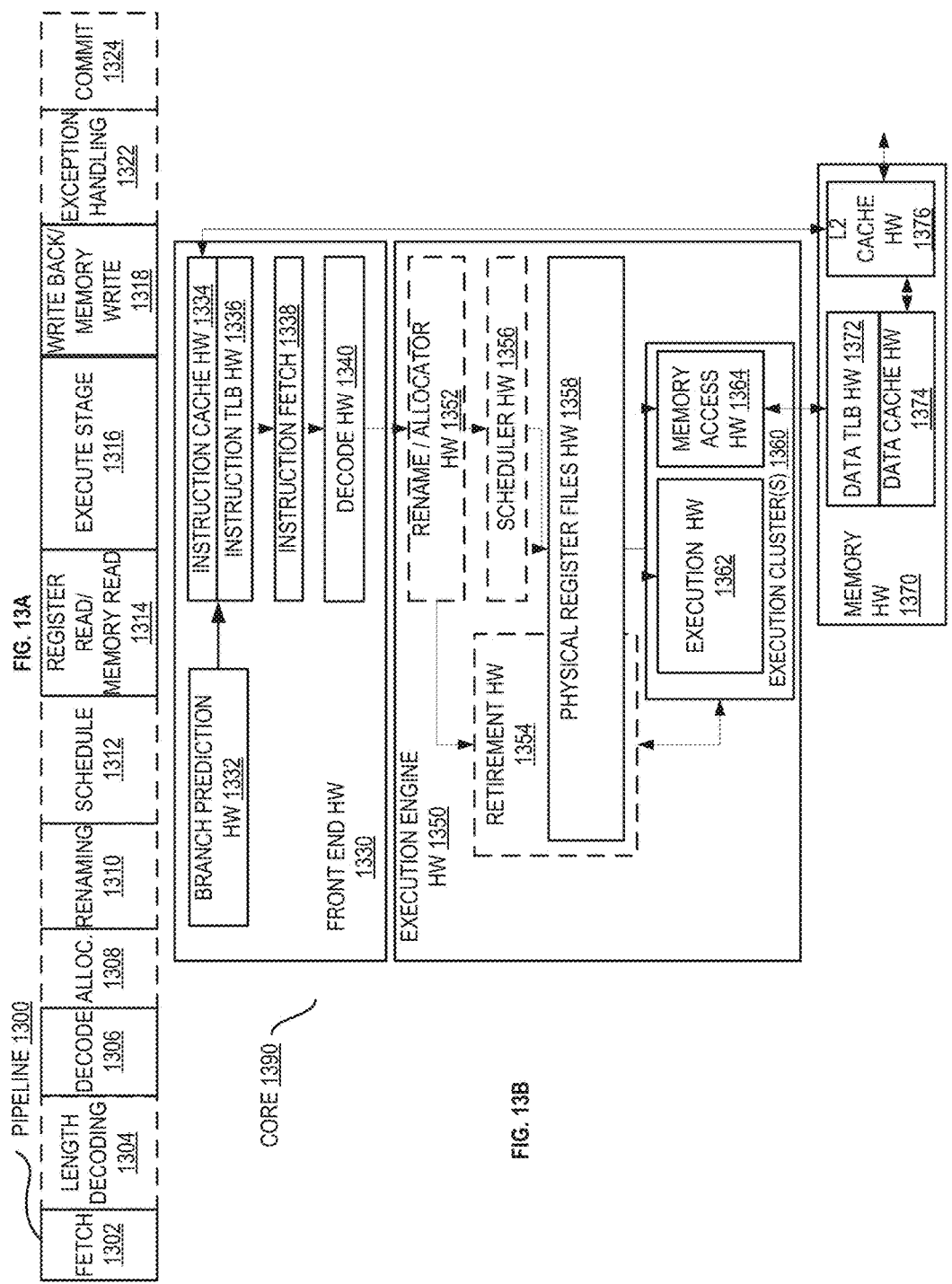
FIG. 13A is a block diagram illustrating both an exemplary in-order pipeline and an exemplary register renaming, out-of-order issue/execution pipeline according to embodiments of the invention.
FIG. 13B is a block diagram illustrating both an exemplary embodiment of an in-order architecture core and an exemplary register renaming, out-of-order issue/execution architecture core to be included in a processor according to embodiments of the invention.

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end hardware 1330 coupled to an execution engine hardware 1350, and both are coupled to a memory hardware 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end hardware 1330 includes a branch prediction hardware 1332 coupled to an instruction cache hardware 1334, which is coupled to an instruction translation lookaside buffer (TLB) 1336, which is coupled to an instruction fetch hardware 1338, which is coupled to a decode hardware 1340. The decode hardware 1340 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode hardware 1340 or otherwise within the front end hardware 1330). The decode hardware 1340 is coupled to a rename/allocator hardware 1352 in the execution engine hardware 1350.

The execution engine hardware 1350 includes the rename/allocator hardware 1352 coupled to a retirement hardware 1354 and a set of one or more scheduler hardware 1356. The scheduler hardware 1356 represents any number of different schedulers, including reservations stations, central instruction window, etc. The scheduler hardware 1356 is coupled to the physical register file(s) hardware 1358. Each of the physical register file(s) hardware 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1358 comprises a vector registers hardware, a write mask registers hardware, and a scalar registers hardware. This register hardware may provide architectural vector registers, vector mask registers, and general purpose registers. The physical register file(s) hardware 1358 is overlapped by the retirement hardware 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1354 and the physical register file(s) hardware 1358 are coupled to the execution cluster(s) 1360. The execution cluster(s) 1360 includes a set of one or more execution hardware 1362 and a set of one or more memory access hardware 1364. The execution hardware 1362 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1356, physical register file(s) hardware 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1364). It should also be understood that where separate pipelines are used, one or more of these pipelines may be out-of-order issue/execution and the rest in-order.

The set of memory access hardware 1364 is coupled to the memory hardware 1370, which includes a data TLB hardware 1372 coupled to a data cache hardware 1374 coupled to a level 2 (L2) cache hardware 1376. In one exemplary embodiment, the memory access hardware 1364 may include a load hardware, a store address hardware, and a store data hardware, each of which is coupled to the data TLB hardware 1372 in the memory hardware 1370. The instruction cache hardware 1334 is further coupled to a level 2 (L2) cache hardware 1376 in the memory hardware 1370. The L2 cache hardware 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode hardware 1340 performs the decode stage 1306; 3) the rename/allocator hardware 1352 performs the allocation stage 1308 and renaming stage 1310; 4) the scheduler hardware 1356 performs the schedule stage 1312; 5) the physical register file(s) hardware 1358 and the memory hardware 1370 perform the register read/memory read stage 1314; the execution cluster 1360 perform the execute stage 1316; 6) the memory hardware 1370 and the physical register file(s) hardware 1358 perform the write back/memory write stage 1318; 7) various hardware may be involved in the exception handling stage 1322; and 8) the retirement hardware 1354 and the physical register file(s) hardware 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1334/1374 and a shared L2 cache hardware 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14:
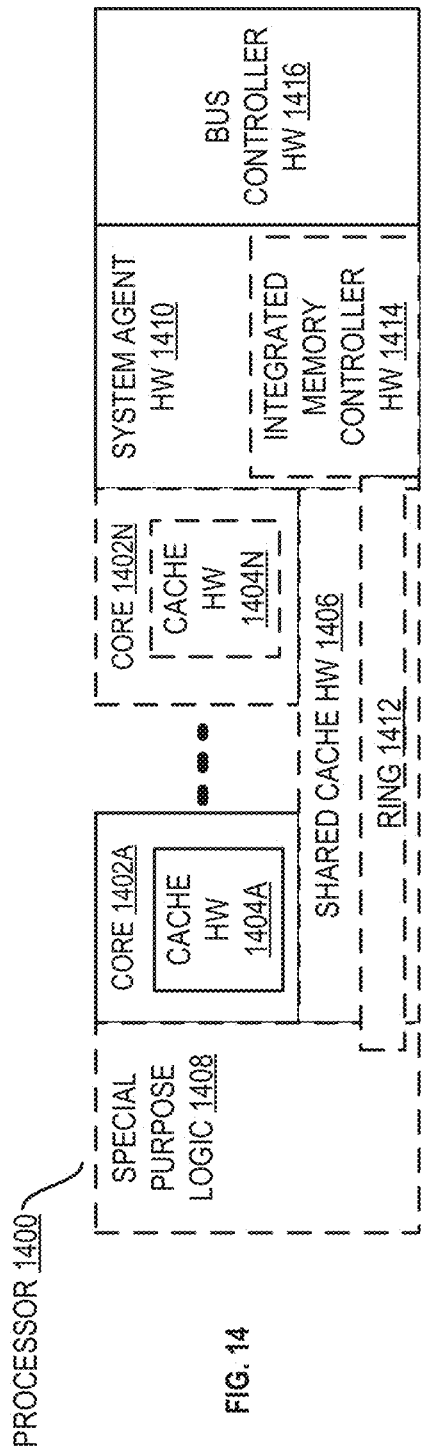
FIG. 14 is a block diagram of a single core processor and a multicore processor with integrated memory controller and graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller hardware 1416, while the optional addition of the dashed lined boxes illustrates an alternative processor 1400 with multiple cores 1402A-N, a set of one or more integrated memory controller hardware 1414 in the system agent hardware 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1406, and external memory (not shown) coupled to the set of integrated memory controller hardware 1414. The set of shared cache hardware 1406 may include one or more mid-level caches, such as level 2 (L2), level 3 (L3), level 4 (L4), or other levels of cache, a last level cache (LLC), and/or combinations thereof. While in one embodiment a ring based interconnect hardware 1412 interconnects the integrated graphics logic 1408, the set of shared cache hardware 1406, and the system agent hardware 1410/integrated memory controller hardware 1414, alternative embodiments may use any number of well-known techniques for interconnecting such hardware. In one embodiment, coherency is maintained between one or more cache hardware 1406 and cores 1402-A-N.

In some embodiments, one or more of the cores 1402A-N are capable of multi-threading. The system agent 1410 includes those components coordinating and operating cores 1402A-N. The system agent hardware 1410 may include for example a power control unit (PCU) and a display hardware. The PCU may be or include logic and components needed for regulating the power state of the cores 1402A-N and the integrated graphics logic 1408. The display hardware is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set. In one embodiment, the cores 1402A-N are heterogeneous and include both the "small" cores and "big" cores described below.

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
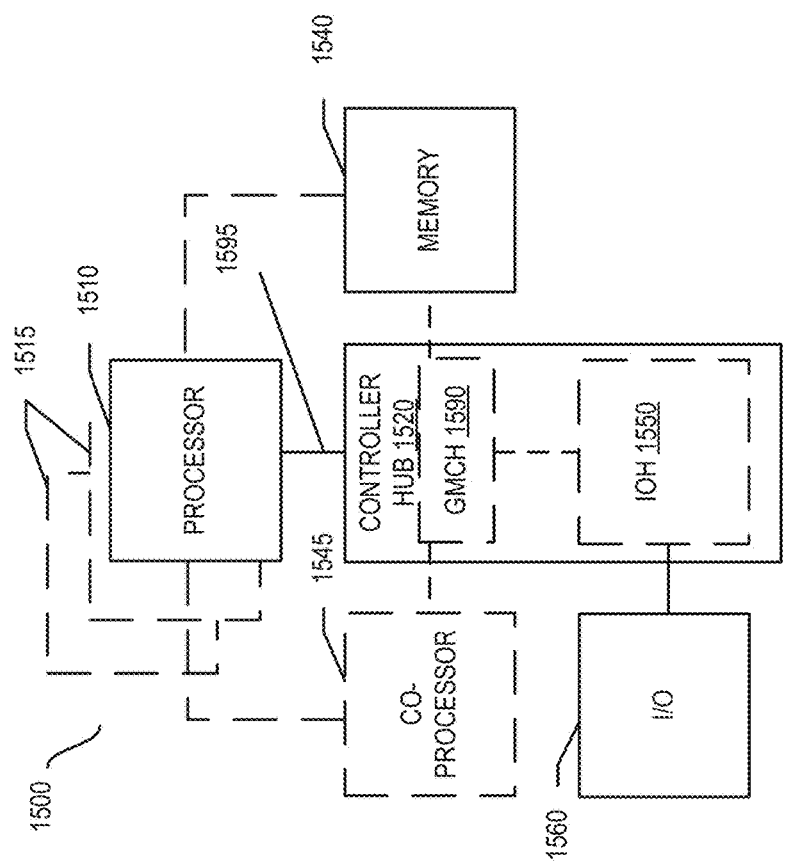
FIG. 15 illustrates a block diagram of a system in accordance with one embodiment of the present invention.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface, or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
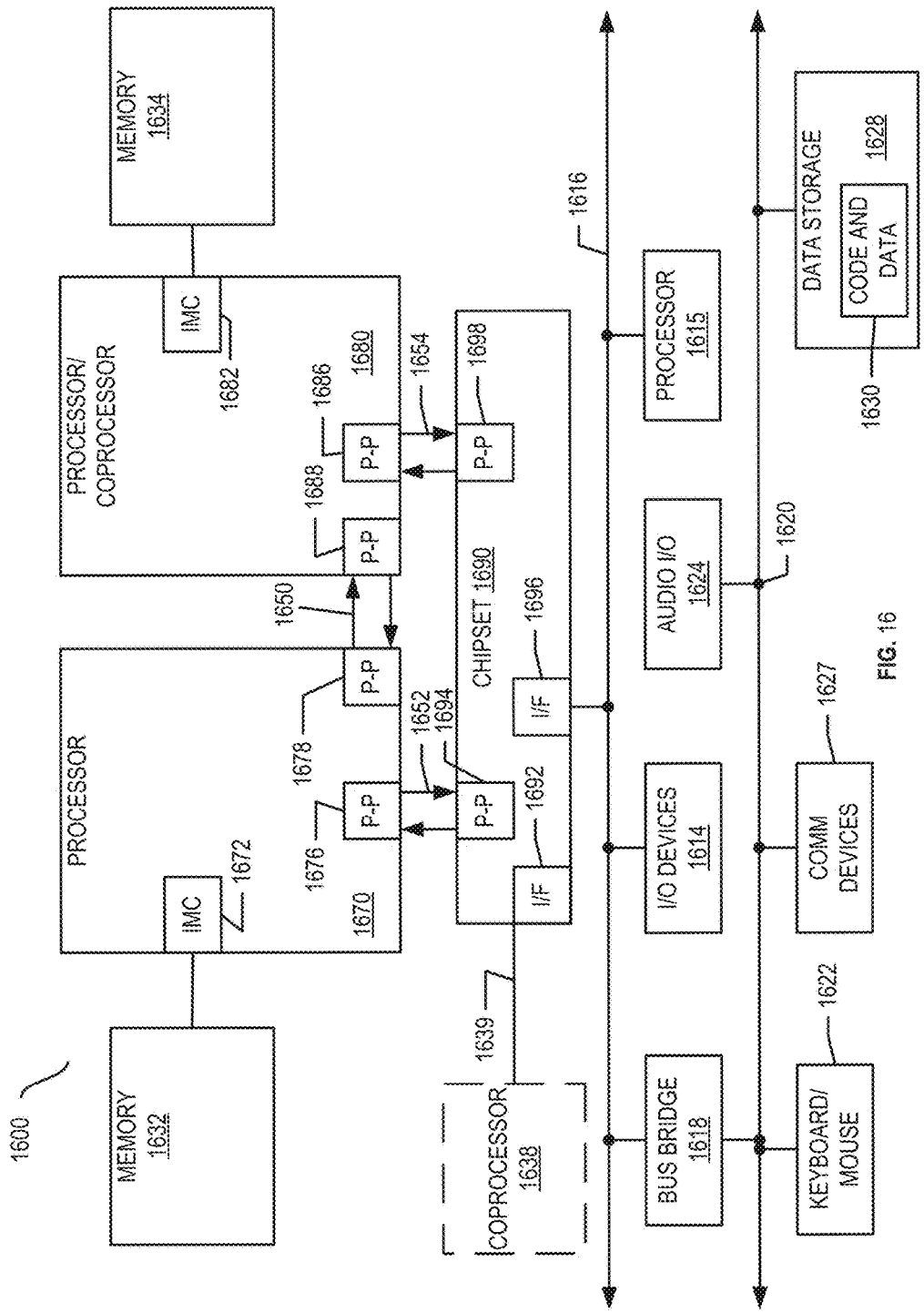
FIG. 16 illustrates a block diagram of a second system in accordance with an embodiment of the present invention.

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) hardware 1672 and 1682, respectively. Processor 1670 also includes as part of its bus controller hardware point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) hardware), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage hardware 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
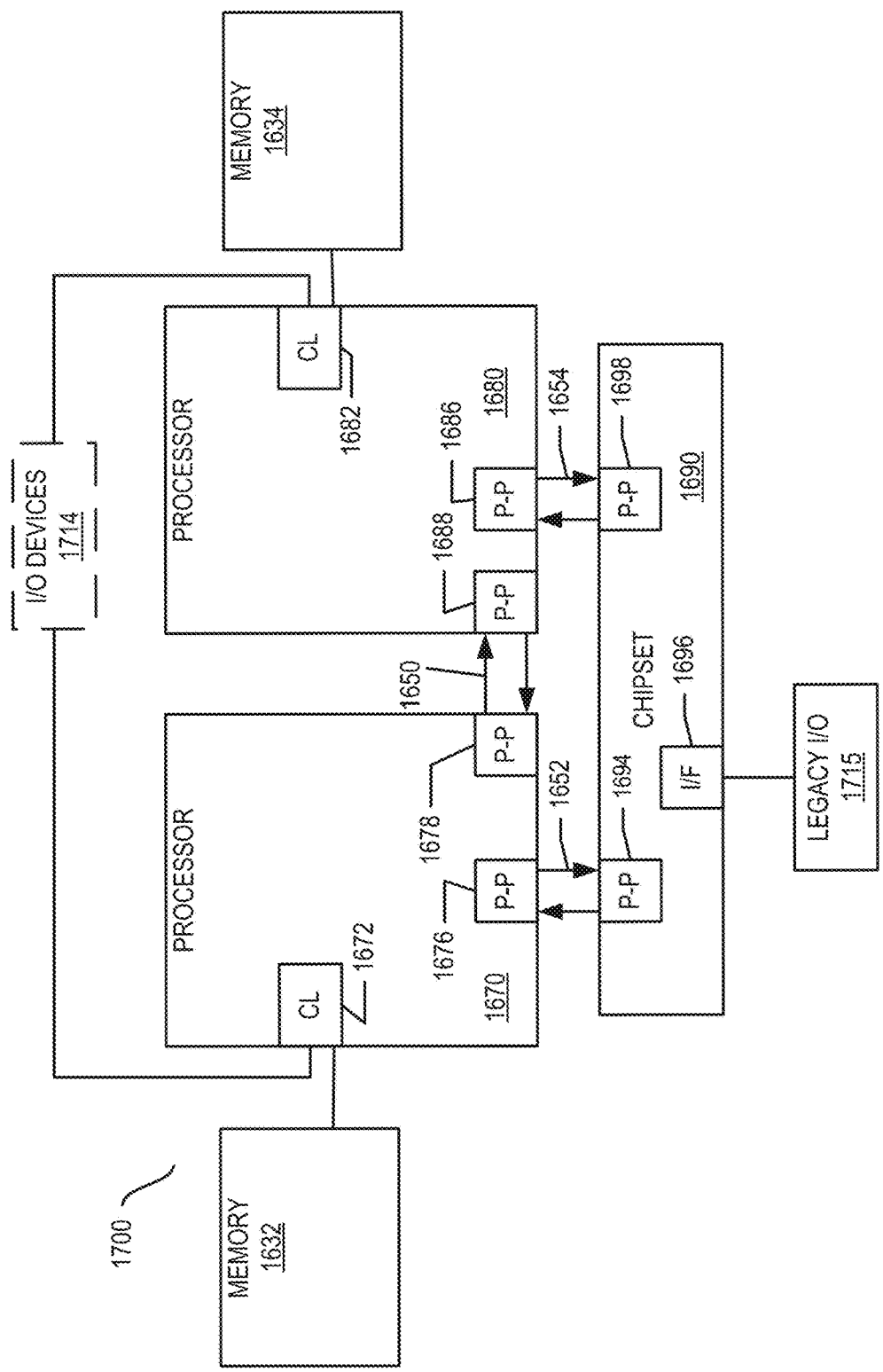
FIG. 17 illustrates a block diagram of a third system in accordance with an embodiment of the present invention.

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller hardware and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
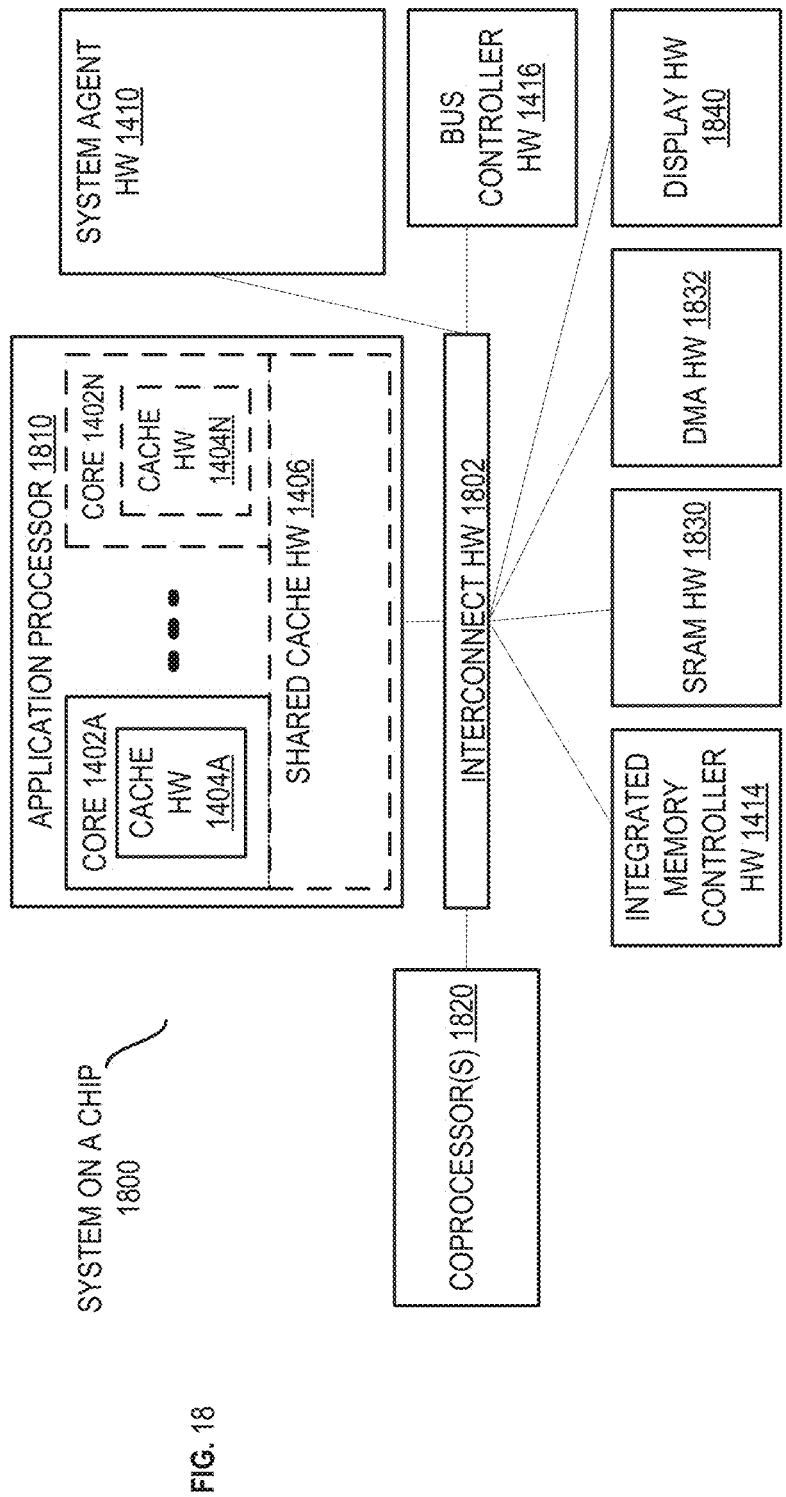
FIG. 18 illustrates a block diagram of a system on a chip (SoC) in accordance with an embodiment of the present invention.

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect hardware 1802 is coupled to: an application processor 1810 which includes a set of one or more cores 1402A-N and shared cache hardware 1406; a system agent hardware 1410; a bus controller hardware 1416; an integrated memory controller hardware 1414; a set or one or more coprocessors 1820 which may include integrated graphics logic, an image processor, an audio processor, and a video processor; an static random access memory (SRAM) hardware 1830; a direct memory access (DMA) hardware 1832; and a display hardware 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:
1. An apparatus comprising:
a distribution circuitry to distribute, among a plurality of processing units, tasks from one or more workflows, the tasks to be processed in an order received by the plurality of processing units, wherein for each process- ing unit, an earlier-received task is to be processed before a later-received task;

a memory to store:
  a history list to track each task distributed by the distribution circuitry and to store information about each processing unit to which each task is distributed;
  an ordering queue to store two or more sub-tasks received from a first processing unit of the plurality of processing units as a result of the first processing unit processing a first task from a first workflow of the one or more workflows, the two or more subtasks to be grouped together based on information in the history list associated with the first task and stored based on an order in which each sub-task was received; and wherein, responsive to a detection that all sub-tasks of the first task have been stored and that the first task is the oldest task in the first workflow, all sub-tasks associated with the first task are to be placed in a replay queue to be replayed in the order in which each sub-task associated with the first task was received.

2. The apparatus of claim 1, wherein each task tracked in the history list is associated with an assigned processing unit to which the task is distributed, a parent workflow identifying one of the one or more workflows that the task is from, and a task identification number (task ID).

3. The apparatus of claim 2, further comprising a ready queue to track, for each task, whether all corresponding sub-tasks have been stored in the ordering queue.

4. The apparatus of claim 3, wherein the ready queue is to track the oldest task in each workflow.

5. The apparatus of claim 4, wherein the oldest task in each workflow is determined based on the task ID associated with each task.

6. The apparatus of claim 1, wherein the distribution circuitry is to distribute the tasks among the plurality of processing units through load-balancing.

7. The apparatus of claim 1, wherein the distribution circuitry is to distribute tasks from the same workflow according to their ordering in the workflow.

8. The apparatus of claim 1, wherein each sub-task in the replay queue is to be distributed by the distribution circuitry as a new task to be processed.

9. The apparatus of claim 1, wherein the ordering queue and the replay queue comprise of linked lists defined by a plurality of head and tail pointers.

10. The apparatus of claim 9, wherein moving sub-tasks from the ordering queue to the replay queue comprises updating the plurality of head and tail pointers.

11. The apparatus of claim 1, wherein the ordering queue comprises of a plurality of sub-lists, each sub-list corresponding to a processing unit and is used to store sub-tasks received from the corresponding processing unit.

12. A method comprising:
  distributing, among a plurality of processing units, tasks from one or more workflows, the tasks to be processed in an order received by the plurality of processing units, wherein, for each processing unit, an earlier-received task is to be processed before a later-received task;
  tracking each task and storing information about each processing unit to which each task was distributed in a history list;
  storing, in an ordering queue, two or more sub-tasks received from a first processing unit of the plurality of processing units as a result of the first processing unit processing a first task from a first workflow of the one or more workflow, the two or more sub-tasks to be grouped together based on information associated with the first task in the history list and stored in accordance with an order in which each sub-task was received; and
  wherein, upon detecting that all sub-tasks of the first task have been stored and that the first task is an oldest-tracked task in the first workflow, responsively placing all sub-tasks of the first task in a replay queue to be replayed in the order in which each sub-task was received.

13. The method of claim 12, wherein each task tracked in the history list is associated with an assigned processing unit to which the task is distributed, a parent workflow identifying one of the one or more workflows that the task is from, and a task identification number (task ID).

14. The method of claim 13, further comprising tracking, for each task, whether all corresponding sub-tasks have been stored.

15. The method of claim 14, further comprising tracking the oldest task in each workflow.

16. The method of claim 15, further comprising determining the oldest task in each workflow based on the task ID associated with each task.

17. The method of claim 12, further comprising distributing the tasks among the plurality of processing units through load-balancing.

18. The method of claim 12, further comprising distribution the tasks from the same workflow based on their ordering in the workflow.

19. The method of claim 12, further comprising distributing each sub-task in the replay queue as a new task to be processed.

20. The method of claim 12, wherein the ordering queue and the replay queue comprise of linked lists defined by a plurality of head and tail pointers.

21. The method of claim 20, further comprising moving sub-tasks from the ordering queue to the replay queue by updating the plurality of head and tail pointers.

22. The method of claim 12, wherein the ordering queue comprises of a plurality of sub-lists, each sub-list corresponding to a processing unit and is used to store sub-tasks received from the corresponding processing unit.

23. A system comprising:
  one or more producers to generate workflows, each of the workflows comprising one or more tasks;
  a plurality of processing units to process the tasks;
  a distribution circuitry to distribute the tasks among the plurality of processing units, wherein the tasks are to be processed in an order received by each of the plurality of processing units such that an earlier-received task is to be processed before a later-received task;
  a history list to track each task distributed by the distribution circuitry and to store information about each processing unit to which each task is distributed;
  an ordering queue to store two or more sub-tasks received from a first processing unit of the plurality of processing units as a result of the first processing unit processing a first task, the first task belonging to a first workflow of the one or more workflows, the two or more sub-tasks to be grouped together based on information associated with the first task in the history list and stored based on an order in which each sub-task was received; and
  wherein, responsive to a detection that all sub-tasks of the first task have been stored and that the first task is the oldest task for a given parent workflow tracked by the history list, all sub-tasks associated with the first task are to be placed in a replay queue to be replayed in the order in which each sub-task associated with the first task was received.

24. The system of claim 23, wherein each tracked task tracked in the history list is associated with an assigned processing unit to which the task is distributed, a parent workflow identifying one of the one or more workflows to which the task belongs, and a task identification number (task ID).

25. The system of claim 23, wherein the distribution circuitry is to distribute the tasks among the plurality of processing units through load-balancing.

* * * * *